US008391639B2

(12) United States Patent
Hillebrand et al.

(10) Patent No.: US 8,391,639 B2
(45) Date of Patent: *Mar. 5, 2013

(54) METHOD AND APPARATUS FOR REALISTIC SIMULATION OF WRINKLE AGING AND DE-AGING

(75) Inventors: Greg George Hillebrand, Wyoming, OH (US); Ramazan Demirli, Whippany, NJ (US)

(73) Assignee: The Procter & Gamble Company, Cincinnati, OH (US)

( * ) Notice: Subject to any disclaimer, the term of this patent is extended or adjusted under 35 U.S.C. 154(b) by 1148 days.

This patent is subject to a terminal disclaimer.

(21) Appl. No.: 12/141,457

(22) Filed: Jun. 18, 2008

(65) Prior Publication Data

US 2009/0028380 A1     Jan. 29, 2009

Related U.S. Application Data

(60) Provisional application No. 60/951,313, filed on Jul. 23, 2007.

(51) Int. Cl.
*G06K 9/36* (2006.01)
(52) U.S. Cl. .................... 382/284; 382/118; 345/639
(58) Field of Classification Search ................ None
See application file for complete search history.

(56) References Cited

U.S. PATENT DOCUMENTS

| | | | | |
|---|---|---|---|---|
| 4,276,570 | A * | 6/1981 | Burson et al. | 382/276 |
| 6,068,848 | A * | 5/2000 | Gubernick et al. | 424/401 |
| 6,094,202 | A * | 7/2000 | Rouet et al. | 345/473 |
| 6,571,003 | B1 * | 5/2003 | Hillebrand et al. | 382/118 |
| 6,734,858 | B2 * | 5/2004 | Attar et al. | 345/475 |
| 6,895,124 | B1 * | 5/2005 | Kira et al. | 382/260 |
| 7,020,347 | B2 | 3/2006 | Zhang et al. | |
| 7,233,693 | B2 * | 6/2007 | Momma | 382/162 |
| 8,094,186 | B2 * | 1/2012 | Fukuoka et al. | 348/77 |
| 2002/0090123 | A1 * | 7/2002 | Bazin | 382/128 |
| 2004/0215066 | A1 * | 10/2004 | Huang et al. | 600/300 |
| 2005/0197542 | A1 * | 9/2005 | Bazin et al. | 600/300 |
| 2005/0248582 | A1 * | 11/2005 | Scheepers et al. | 345/586 |
| 2006/0034542 | A1 * | 2/2006 | Aoyama | 382/276 |
| 2006/0274071 | A1 * | 12/2006 | Bazin | 345/475 |

(Continued)

FOREIGN PATENT DOCUMENTS

EP    0883090    12/1998

OTHER PUBLICATIONS

Liu et al. (Aug. 2001) "Expressive expression mapping with ratio images." Proc. ACM SIGGRAPH 2001, pp. 271-276.*

(Continued)

*Primary Examiner* — Barry Drennan
(74) *Attorney, Agent, or Firm* — John G. Powell

(57) ABSTRACT

Methods and systems are disclosed to realistically simulate facial wrinkle aging of a person using a neutral state (natural look) image and one or more expression images (e.g., smile, frown, pout, wink) that induce wrinkles. The neutral and expression images are processed to simulate wrinkle aging by registering the wrinkles that are visible in the expression image onto the neutral image, thereby generating a wrinkle-aged simulated image. Advantageously, a person's own wrinkle histological data is utilized, hence providing an accurate and realistic wrinkle aging simulation. Similarly, the neutral image is processed to eliminate all visible wrinkles thereby generating a wrinkle de-aged simulation image. Additionally, blending of a neutral image with an aged or de-aged simulation image is disclosed, where the degree of blending is based on statistical modeling of skin condition with age and/or expected outcome of a particular type of treatment. The methods and systems disclosed have wide applicability, including, for example, areas such as dermatology, cosmetics and computer animation, among others.

15 Claims, 16 Drawing Sheets

U.S. PATENT DOCUMENTS

2008/0212894 A1* 9/2008 Demirli et al. ............... 382/276
2009/0196475 A1* 8/2009 Demirli et al. ............... 382/128

OTHER PUBLICATIONS

Liu, J. (Feb. 2007) "A study on face morphing algorithms." http://ccrma.stanford.edu/~jacobliu/368Report/index.html as retrieved from The Internet Archive, www.archive.org.*
Wu et al. (1999) "Simulating wrinkles and skin aging." The Visual Computer, vol. 15 pp. 183-198.*
Lanitis et al. (Apr. 2002) "Toward automatic simulation of aging effects on face images." IEEE Trans. on Pattern Analysis and Machine Intelligence, vol. 24 No. 4, pp. 442-455.*
Gilchrest, B. "Photodamage", Blackwell Science, Inc. 1995.
Leyden J.J. "Clinical Features of Ageing Skin", Br. J. Dermatol. vol. 122, Suppl. 35, pp. 1-3, 1990.
Bailey, Molecular Mechanisms of Aging in Connective Tissues, Mech. Aging Dev., vol. 122, No. 7, pp. 735-755, 2001.
Kligman et al., Br. J. Derm. 1985, 113:37-42.
Hussein, K.H, "Toward Realistic Facial Modeling and Re-Rendering of Human Skin Aging Animation", Proceedings of the Shape Modeling International 2002, IEEE Computer Society, 2002.
Hysert PE et al. "At Face Value: Age Progression Software Provides Personalized Demonstration of the Effects of Smoking on Appearance." Tobacco Control, vol. 12, pp. 238-240, 2003.
Boissiux et al. "Simulation of Skin Aging and Wrinkle with Cosmetic Insight", Computer Animation and Simulation, pp. 15-27, 2000.
"A Multi-Resolution Spline with Application to Image Mosaics", ACM transactions on Graphics, vol. 2, No. 4, Oct. 1983.
"Principal Warps: Thin-Plate Splines and the Decomposition of Deformations", IEEE Transactions on Pattern Analysis and Machine Intelligence, vol. 11, No. 6, Jun. 1989.
Miyamoto, K. et al., "The Beauty Imaging System: For the Objective Evaluation of Skin Condition," Journal of Cosmetic Science, 53 (1), 2002, pp. 62-65.

* cited by examiner

METHOD AND APPARATUS FOR REALISTIC SIMULATION OF WRINKLE AGING AND DE-AGING

RELATED PATENT APPLICATIONS

The present application claims priority from U.S. Provisional Patent Application No. 60/951,313, filed on Jul. 23, 2007, which is incorporated herein by reference in its entirety.

FIELD OF THE INVENTION

The present invention relates to the field of image processing and particularly to the processing of images of skin and the simulation of aging or de-aging thereof.

BACKGROUND INFORMATION

The effects of skin aging on the appearance of the human face are well studied and documented in dermatology. Each individual's skin aging progression is dependent on both intrinsic and extrinsic factors. Intrinsic factors, like gender, race, and skin pigmentation, are genetically programmed and unique for each individual and can affect the rate of dermal thinning, loss of mechanical elasticity, and other well-characterized histological and bio-mechanical changes with age. Intrinsic factors affect both sun-protected and sun-exposed body sites. Extrinsic factors include an individual's diet, lifestyle, skin care habits and sun exposure history. Chronic sun exposure is well-known to accelerate the onset time and severity of skin aging (also called photoaging). All exposed body sites including the face have some degree of skin photoaging. (Gilchrest., B. *Photodamage*, Blackwell Science, Inc. 1995).

One of the most visually prominent features of aged facial skin is fine lines and wrinkles (Leyden J. J. "Clinical features of ageing skin", *Br. J. Dermatol* Vol. 122, Suppl. 35, pp: 1-3, 1990) caused in part by the gradual alteration and loss of dermal connective tissues such as collagen and elastin, especially in sun-exposed areas of the body (Bailey, Molecular mechanisms of aging in connective tissues, *Mech. Aging Dev.*, Vol. 122, No. 7, pp.: 735-755, 2001). Skin is a multi-layered tissue with an outer stratum corneum (10-20 µm), a living epidermis (50-100 µm), a dermis (1-3 mm) and hypodermis composed primarily of adipocytes. The skin is connected to the underlying musculature via connective tissue and the muscles are attached to the skull bone.

With facial expressions such as smiling, muscles such as the zygomatic major and the obicularis oculi contract and the surface area of the skin shrinks around the eyes and on the cheek. Since skin is incompressible, when the surface area shrinks, the excess skin buckles and forms wrinkles perpendicular to the direction of contraction. The generation of 'crows feet' or 'laugh lines' around the eye are common examples of such wrinkles. When the muscles relax, the surface area returns to normal and the wrinkles disappear. Wrinkles that form and disappear in this way are called expressive, dynamic, or temporary wrinkles. Over time, the mechanical stress caused by repeated facial expression along the same skin groove eventually causes these temporary wrinkles to become visible without expression (Kligman et al., Br. J. Derm. 1985, 113:37-42). Wrinkles which are visible without facial expression are called permanent, persistent or static wrinkles. The conversion from temporary to persistent wrinkles is influenced by the structural integrity of the underlying dermal matrix proteins. The age-dependent loss in skin elasticity, which is accelerated by chronic sun exposure and smoking, weakens the dermal matrix structure and speeds up the onset time of permanent wrinkles. Importantly, each individual develops permanent facial wrinkles that are unique in length, width, depth and position on the face, as unique as their own fingerprints.

The ability to predict and visualize an individual's future facial skin wrinkling has utility in computer animation, facial recognition, missing person identification, entertainment, medicine and cosmetics. Various models have been employed to enable the realistic simulation of an aging face including geometric models, physically-based models, bio-mechanical models and image-based models (Hussein, K. H, Toward realistic facial modeling and re-rendering of human skin aging animation, *Proceedings of the Shape Modeling International* 2002, IEEE Computer Society, 2002). For visualization purposes, image-based models produce more realistic simulation than physical-based models. Image-based models typically use images of real people in various ways to simulate aging effects.

Several approaches have been taken to personalize aging simulation using image-based models so that it more accurately depicts a particular person's future aged appearance. For example, aging algorithms have been developed based on a population cohort of images combined with published data regarding facial changes associated with aging in order to simulate an aged appearance of an individual (Hysert P E et al. "At Face Value: age progression software provides personalized demonstration of the effects of smoking on appearance." Tobacco Control, Vol. 12, pp: 238-240, 2003). A limitation of this method is that the aged image is a reflection of population norms, and does not necessarily reflect the individual's unique aging process.

Boissiux et al. developed an image-based model for simulating skin aging whereby generic masks of pre-computed wrinkles are applied as textures on a 3D model of a person's face. Eight basic masks are employed and the particular mask used is matched to the person's gender, shape of face and type of expression being simulated (Boissiux et al. "Simulation of skin aging and wrinkle with cosmetic insight", *Computer Animation and Simulation*, pp 15-27, 2000). Because of its dependence on a generic mask, this approach is also limited in its ability to accurately predict each person's unique skin features that will appear with age.

U.S. Pat. No. 7,020,347 to Zhang et al. entitled "System and method for image-based surface detail transfer," describes a method for transferring the geometric details of an old face onto that of a young face in order to make the young face look old. Conversely, the surface details of a young face can be transferred to that of an old to make an old face look young. This approach is limited by the fact that the aging features of the old face will not be exactly the same features that the young face will eventually realize.

An object of the present invention is to provide a method to more accurately predict and visualize an individual's future facial skin wrinkling unique to that particular person. It is a another object of the present invention to provide a method to predict an individual's facial skin wrinkling at a specific point in time in the future based on, for example, that person's sex, skin type, and/or ethnicity. It is still another object of the present invention to provide a method to predict and visualize an individual's future skin wrinkling with or without a cosmetic or dermatological treatment.

SUMMARY OF THE INVENTION

In an exemplary embodiment, the present invention provides a method and system for generating images of a person depicting the predicted appearance of wrinkles based on an image or images of that person with one or more facial expressions (referred to as expression images) and an image of the same person with a neutral or relaxed expression (referred to as a neutral image).

In accordance with an aspect of the present invention, apparatus and methods process the neutral and expression images of a person to generate a wrinkle aged image personalized for that particular person. An exemplary embodiment of the present invention uses a person's own histological wrinkle data to simulate their predicted wrinkle aging, thereby providing a more accurate and realistic simulation of wrinkle aging.

In a further aspect of the present invention, the wrinkles detected in an expression image of a face are transported onto a neutral image of the face without affecting the natural or relaxed look of the face to create a realistic prediction of wrinkle aging.

In another aspect of the invention, different expression images can be utilized so as to depict wrinkles in different parts of the face and render a composite wrinkle aged image. For example, forehead wrinkles become more evident with a frown expression whereas cheek wrinkles and nasolabial fold wrinkles become more evident with a smile expression. Other facial expressions may be better suited for wrinkles in other regions of the face. While smile and frown expressions are described for illustration, the present invention can utilize a variety of different facial expressions to simulate wrinkle aging in a variety of facial regions.

In another aspect of the present invention, the neutral image and wrinkled aged image can be blended, with the degree of blending adjusted with a control mechanism (e.g., slider control, knob, etc.) to obtain a rendered image illustrating the wrinkled aged image after a certain period of time.

In a further aspect of the present invention, the amount of blending of neutral and wrinkled aged images can be adjusted in accordance with a statistical wrinkle aging model to simulate the amount of wrinkle aging predicted for an individual at a certain age in the future. The statistical aging model of wrinkles can be obtained preferably from the peer group for that particular individual based on, for example, the sex, skin type, ethnicity, and/or geographic location of the person. Techniques that can be used in deriving a statistical wrinkle aging model based on population data and quantifying the severity of skin defects are described in U.S. Pat. No. 6,571,003 to Hillebrand, et al., entitled "Skin imaging and analysis systems and methods," which is incorporated herein by reference in its entirety. Wrinkle detection and aging simulation are described in U.S. patent application Ser. No. 11/681,509, filed Mar. 2, 2007, entitled "Method and apparatus for simulation of facial skin aging and de-aging," which is incorporated herein by reference in its entirety.

As with the wrinkle aged image, discussed above, the neutral image and a wrinkle de-aged image can be blended with the degree of blending adjusted with a control mechanism (e.g., slider control, knob, etc.) to obtain a rendered image illustrating varying degrees of wrinkles de-aging. Wrinkle de-aged images depicting simulated de-aging of wrinkles on a face based on detecting and eliminating wrinkles appearing on an image of the face can be generated as described in the aforementioned U.S. patent application Ser. No. 11/681,509. Such de-aged images can be used to illustrate the outcomes of wrinkle reduction after using treatments such as topical formulations, injectable fillers, injectable botulinum toxins, fractional resurfacing, light/laser therapy, etc. The degree of de-aging wrinkles can be linked to wrinkles de-aging models based on a specific type of treatment. The degree of de-aging wrinkles can also be linked to the aforementioned statistical aging models for the individual's peer group (e.g., sex, skin type or geography).

The above and other aspects and features of the present invention will be apparent from the drawings and detailed description which follow.

DETAILED DESCRIPTION

Overview of Exemplary Embodiment

Figure 1:
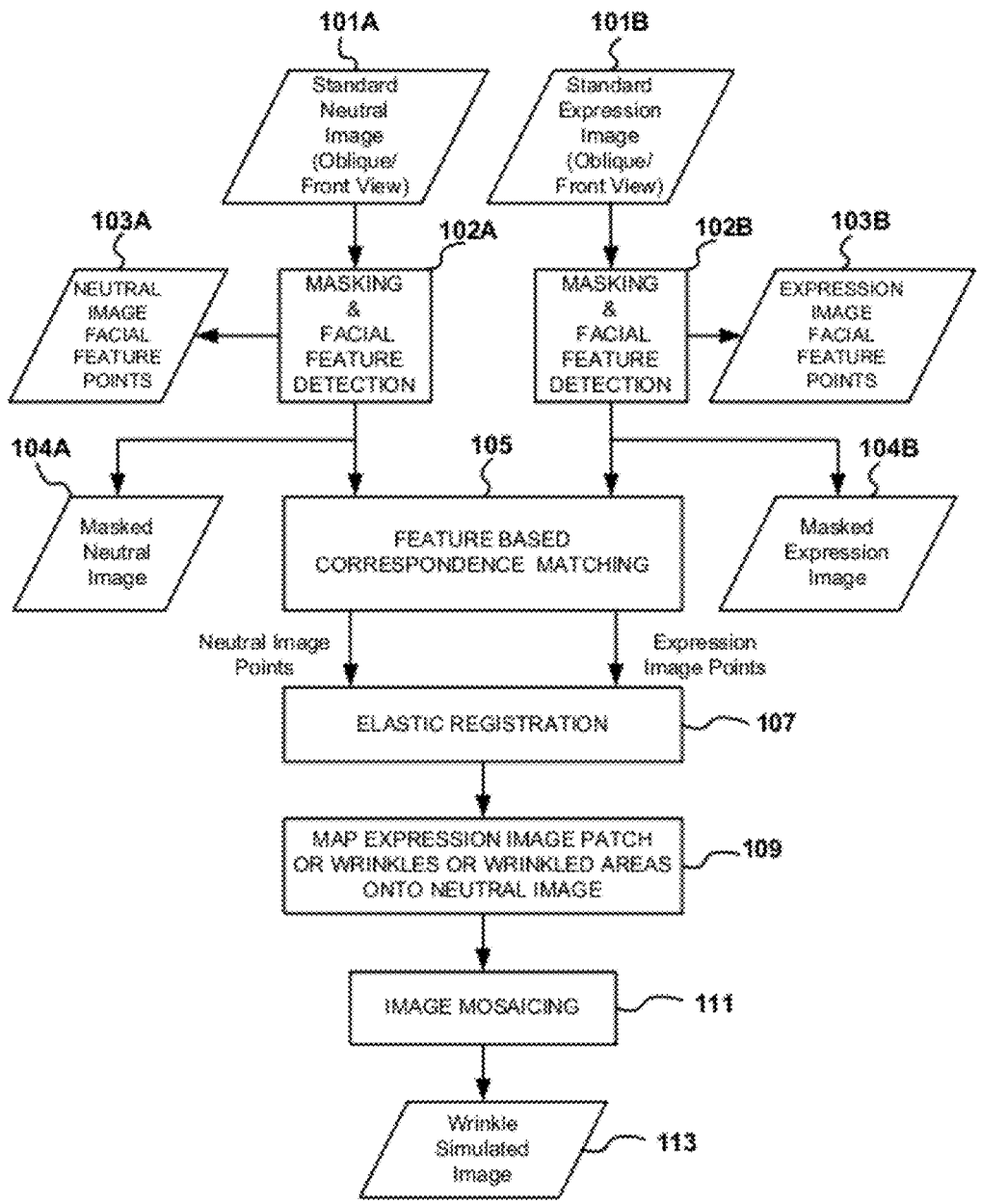
FIG. 1 is a high-level flowchart of an exemplary method for generating a wrinkle aging simulated image utilizing a neutral image and an expression image of a person, in accordance with the present invention.

FIG. 1 is a high-level flowchart illustrating an exemplary wrinkle aging simulation method in accordance with the present invention. At 101A, a close-up facial photograph of a person in a neutral state (also referred to as a relaxed or expressionless state) is captured under standard light, such as with a conventional digital camera. At 101B, a photograph of the same subject with an expression is captured under the same conditions. The present invention is not limited to any particular facial expression and it is contemplated that any facial expression that causes wrinkling may potentially be used to generate an expression image, including, for example, a smile, a frown, a pout, a wink, a squint, or an expression of surprise.

In order to provide standardized and reproducible illumination conditions and image registration, the two images are preferably captured with an automated and controlled facial image capture system, such as the VISIA Complexion Analysis System (hereafter referred to as VISIA) available from Canfield Scientific, Inc. Furthermore, the two pictures may be captured in either oblique or frontal view. The present embodiment uses an oblique view to better display the facial skin areas with wrinkles, such as the crows-feet and nasolabial fold areas.

In the exemplary embodiment, the standard light images obtained at 101A and 101B can be expressed as RGB (red, green, blue) color images. At 102A, a masking procedure and facial feature detection are applied to the neutral image. The masking procedure entails delineating specific areas of the face, especially those areas containing wrinkles, such as, for example, the crows-feet and nasolabial fold areas. Facial feature detection generates a set of facial feature points identifying certain facial features of interest. Masking and facial features detection processes will be described below in greater detail. Similarly at 102B, masking and facial feature detection are applied to the expression image.

A set of neutral image facial feature points 103A and a set of expression image facial feature points 103B are generated at 102A and 102B, respectively, to be used in registration and mapping processes described below. Additionally, a masked neutral image 104A is generated at 102A and a masked expression image 104B is generated at 102B.

Operation then proceeds to 105 in which a correspondence matching process is performed between the masked neutral and expression images, 104A and 104B, respectively. The correspondence matching process generates a set of correspondent image points. A feature-based correspondence matching process is described below in greater detail.

An elastic registration process is performed at 107 based on the correspondent image points generated by the correspondence matching process. The elastic registration process provides a mapping from each pixel in the expression image to a corresponding pixel in the neutral image. An elastic registration process is described below.

A mapping of wrinkles from the expression image to the neutral image is performed at 109 based on the elastic registration mapping generated at 107. Mapping can be performed on the whole masked expression image; on subsections, or patches, of the masked expression image (e.g., crows-feet, peri-orbital area, nasolabial fold); or on a wrinkle-by-wrinkle basis, with wrinkle coordinates detected from the expression image. U.S. patent application Ser. No. 11/681,509, "Method and apparatus for simulation of facial skin aging and de-aging," describes how to detect wrinkles within a specific mask. The process performed at 109 will be described in detail below.

As mentioned above, wrinkles within the masked expression image can be transported onto the neutral image (at 109) on a patch-by-patch basis. Because of potential shading and color differences, however, there may be mismatches along the border between a transported patch and the neutral image. Such artifacts can be eliminated using an image mosaicing technique at 111. A preferred image mosaicing technique for use in this embodiment utilizes a multi-resolution decomposition technique, such as that described by Burt and Adelsan in "A multi-resolution spline with application to image mosaics", ACM transactions on Graphics, Vol. 2, No. 4, October 1983. Other known blending techniques can also be used.

After eliminating the border artifacts through a mosaicing technique, the wrinkle simulated image is generated at 113. This image displays dynamic wrinkles, which otherwise are evident only on an expression image, on the neutral image, thereby providing a realistic representation of wrinkle aging with time.

The wrinkle simulated image (113) can be further enhanced to more visibly display wrinkles in the image. Such enhancement can be performed by using a wrinkle aging simulation method such as described in U.S. patent application Ser. No. 11/681,509. The technique detects and emphasizes wrinkles on the face. Other feature enhancement techniques (e.g., edge enhancement methods) can also be used to make the wrinkle aging effect more dramatic.

Masking and Facial Feature Detection

Wrinkle aging simulation should be performed preferably on skin areas of the face that include wrinkles and the nasolabial fold. In an exemplary embodiment of the present invention, non-skin regions of the face, such as, for example, the lips, hair, eyes, eye brows, and nostrils are excluded from the simulation. A technique for detecting the skin regions of the face is described in U.S. patent application Ser. No. 11/681,509. This method generates a skin map, which delineates the skin regions of the face and eliminates non-skin regions such as lips, eyes, eyebrows, and hair.

Figure 10:
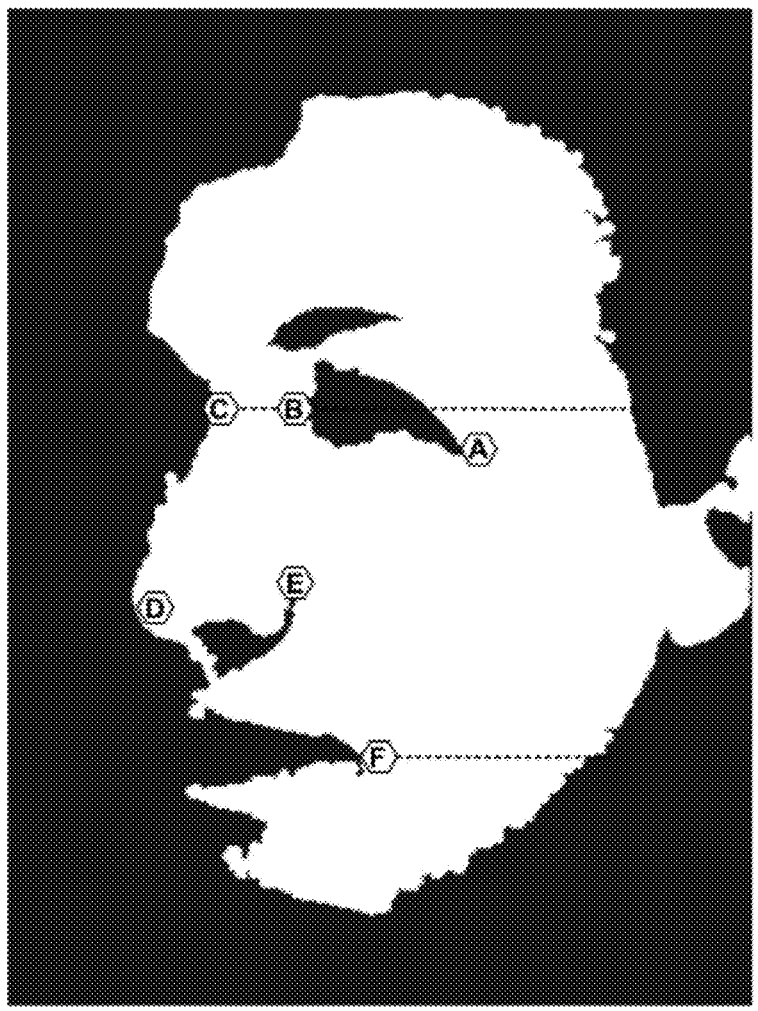
FIG. 10 shows an exemplary facial skin map and a few illustrative key facial feature points generated by an exemplary method based on a full-face oblique view image, in accordance with the present invention.

An exemplary facial skin map for an oblique view image is shown in FIG. 10. From this skin map, one can identify some key facial feature points and design a mask to cover wrinkle areas of the face. For example, the corners of the eye, points A and B, are marked as the right-most and left-most points of the eye area delineated in the skin map. Facial feature point C is defined as the intersection of the eye line and the bridge of the nose. Facial feature point D is the tip of the nose. Facial feature point E is the top of the nasolabial fold near the nose. Facial feature point F is the corner of the lips. One can design a specific mask to cover certain specific areas of the face using these facial feature points. For example, the dotted horizontal lines drawn through facial feature point B and facial feature point F can be used as upper and lower limits to design a mask covering skin areas under the level of the eyes and above the level of the lips.

The present invention utilizes some of the aforementioned facial feature points in the elastic registration process. In a preferred embodiment, the three facial feature points A, B, and E are good landmark points that can be identified consistently between the neutral and expression images. The identification of these facial feature points will aid the correspondence matching process and facilitate registration.

Feature-Based Correspondence Matching

Figure 2:
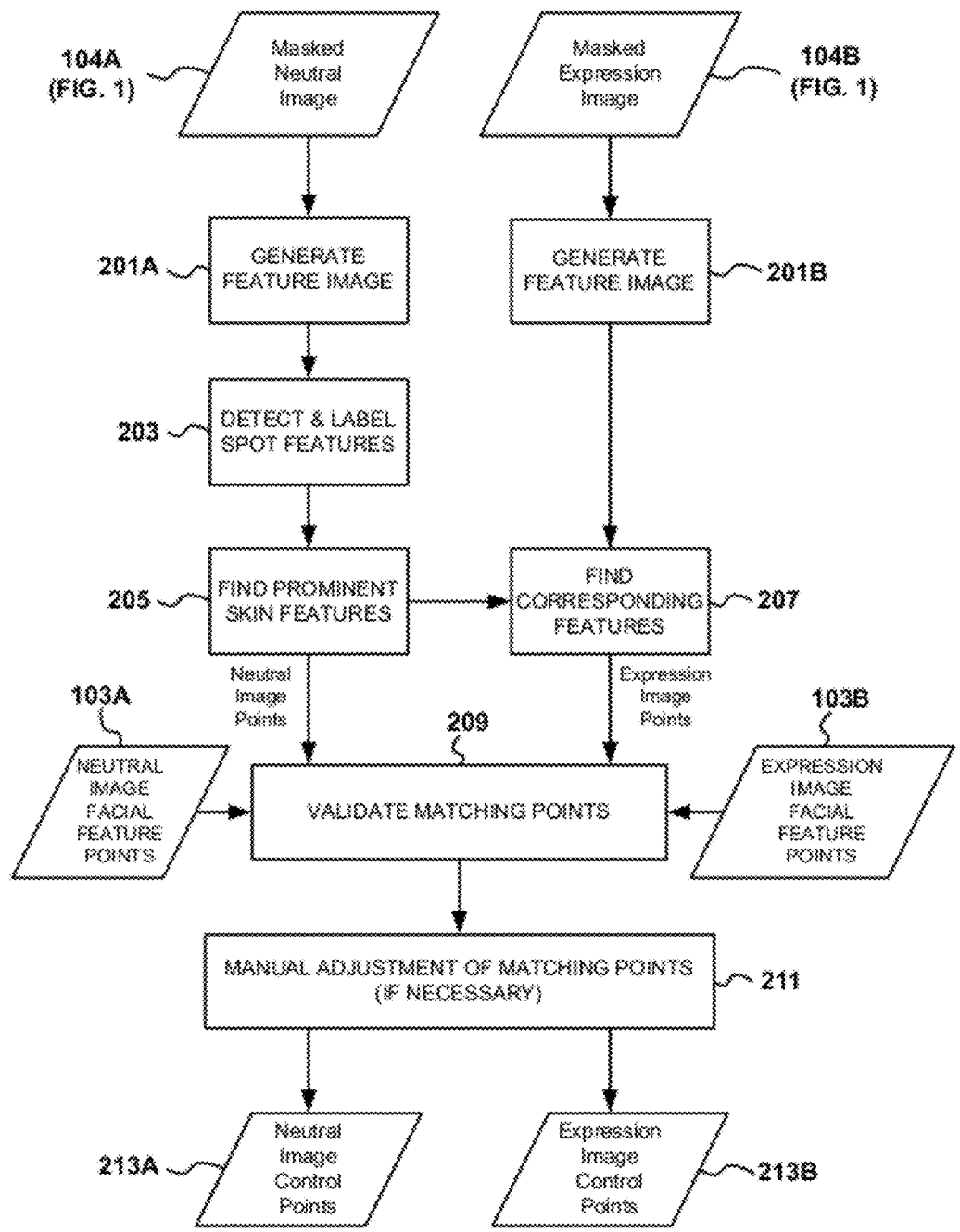
FIG. 2 is a flowchart of a correspondence-finding algorithm between a neutral image and an expression image, in accordance with an exemplary embodiment of the present invention.

FIG. 2 shows a flow-chart of an exemplary feature-based correspondence matching process which takes the masked portions of the neutral and expression images as inputs and returns a set of corresponding control points to be used in the registration process. The feature-based correspondence matching process is based on finding the same skin features on both images.

First, the masked neutral and expression images, 104A and 104B, respectively (from FIG. 1), are processed at 201A and 201B to generate feature images. Feature images emphasize skin features and prove to be more useful for correspondence matching than the original images. The preferred feature image in the present invention is the average of the blue and green channels of the standard RGB image. Blue and green channels are known to display hyperpigmented spots and pores better because such features exhibit more absorption in the blue and green spectrums. One can also use other techniques for generating a feature image, e.g., the intensity image, or the luminacity (L) channel of the CIE LAB transformed image, or a contrast image using other known contrast generation techniques.

Upon generation of the neutral and expression feature images, spot features (e.g., brown spots, large pores, etc.) are detected and labeled at 203 based on the neutral image. Spot features are more easily detectable in the neutral image than the expression image due to the presence of deformation in the expression image. U.S. patent application Ser. No. 11/681,509 describes a process for detecting spot features from an intensity or contrast image. Note that only prominent features (e.g., larger than a certain size and above some contrast threshold) are used for correspondence matching because these features are more likely to be detectable in the expression image.

After features are detected and labeled, prominent skin features are found at 205. In doing so, the neutral image is divided into blocks of a certain size. The block size is preferably based on the desired number of correspondence points. For each block, the most prominent feature is found and encapsulated with a bounding box. This bounding box is used to crop a rectangular patch from the neutral feature image (from 201A) and used as a template to search for the same feature in the expression feature image (from 201B). A template matching technique is utilized at 207 to find the location of the corresponding small rectangle patch in the expression feature image. The template matching technique utilizes a normalized cross-correlation measure to find the location of the matching feature, however, other metrics (e.g., mutual information (MI), energy of histogram differences (EHD), etc.) can also be used for this purpose. Some matches can be rejected if the matching metric is below a certain threshold. For example, a threshold of 0.5 can be used for normalized cross-correlation to reject weak correspondences. This process is repeated for each block in the neutral image and a set of corresponding points (neutral image points and expression image points) are returned from the processes 205 and 207. One can either automatically or manually add to these sets of points the neutral image facial feature points 103A and the expression image facial feature points 103B. These facial feature points (e.g., the corners of the eye, top of the nasolabial fold) were previously determined at 102A and 102B in the process shown in FIG. 1. Addition of these points should improve the wrinkle registration, especially around the eye area.

At 209, a procedure is carried out to validate the matching points. There are a variety of validation procedures that use geometric techniques, such as Delaunay tringularization, for example, to eliminate pairs that are wrongfully matched. In an exemplary embodiment, triangle geometry is used for three corresponding points, and a triangle similarity measure based on the angles and lengths of the triangle is used to reject outliers. Triangle geometry can also be used to predict the approximate location of a target point based on two matching target points already found and the triangle formed by the three corresponding reference points. Such a process reduces the search space, improves correspondence matching, and reduces processing time.

After matching points validation (209), there may still remain some pairs of points that do not exactly match. At 211, these pairs can be corrected manually, for example, with a graphical user interface (GUI) tool that displays both images with the labeled corresponding points. The images are preferably the feature images generated at 201A and 201B but can also be the original neutral and expression images. The operator can correct the mismatched correspondent points, add new corresponding points, or remove outlier points. All of the corresponding points should match after this manual operation. Mismatching pairs may cause undesirable artifacts on the final simulated image when wrinkles from the expression image are transported to the neutral image.

Elastic Registration and Mapping

Figure 3:
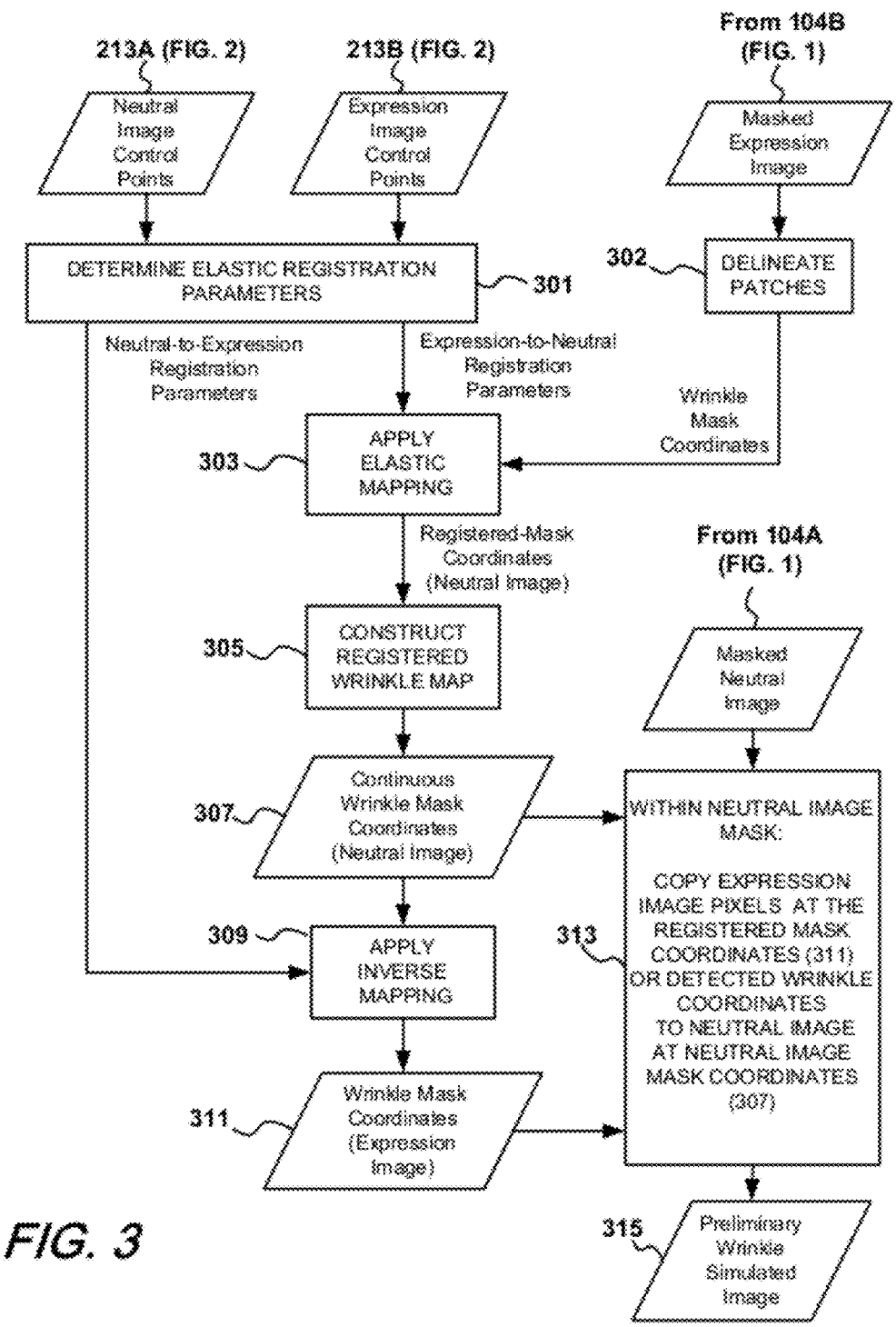
FIG. 3 is a flowchart of an exemplary elastic registration and mapping algorithm to transport wrinkles from an expression image onto a neutral image, in accordance with the present invention.

An exemplary elastic registration and mapping process is illustrated in FIG. 3. In order to register wrinkles from the expression image onto the neutral image, a spatial mapping between the expression image and the neutral image, within the region-of-interest (i.e., masked region), is first determined. The masked regions for the neutral and expression images are used to find a set of matching control points which in turn will be used to define a mapping. Based on a set of neutral image control points and expression image control points obtained after correspondence matching, elastic registration techniques can be used to define a one-to-one spatial mapping between the two images. Once the mapping is established, the wrinkles from the expression image can be transported to their proper locations in the neutral image.

FIG. 3 is a flowchart of an exemplary process for elastic registration and mapping between the neutral and expression images. Among other registration techniques that can be used, elastic registration is preferred for representing the morphing of the face going from the neutral to the expression state. There are a variety of known elastic registration techniques (e.g., thin-plate spline (TPS), multi-quadratic (MQ), piecewise linear (PL)), some of which are included as part of image processing software packages. A preferred embodiment of the present invention uses a TPS technique commonly used in biomedical image registration and is more appropriate for defining a smooth mapping between two images with a high degree of elasticity.

The neutral image control points 213A and expression image control points 213B generated by the correspondence matching process of FIG. 2, are used, at 301, to determine the parameters of elastic registration. A method of estimating TPS registration parameters from a set of corresponding points that can be used for this purpose is described in Bookstein et al., "Principal Warps: Thin-Plate Splines and the Decomposition of Deformations", IEEE Transactions on Pattern Analysis and Machine Intelligence, Vol. 11, No. 6, June 1989.

The TPS parameters determined at 301 are then used at 303 to map the coordinates of areas of interest in the expression image to the neutral image. Such areas of interest contain wrinkles, and are also referred to herein as wrinkle patches. A wrinkle patch can be the whole or a sub-section of the masked expression image (104B, FIG. 1) containing wrinkles. At 302, one or more wrinkle patches are delineated in the masked expression image. In an exemplary embodiment, one or more wrinkle patches can be delineated within the masked expression image by overlaying the mask on the original image and allowing an operator to manually select the desired portion or portions of the image within the mask. Alternatively, the operator can select wrinkle patches from the image constrained to the skin regions without using the mask. Patch delineation may also be carried out automatically in accordance with suitable algorithms. As such, instead of mapping the entire masked expression image to the neutral image, the method of the present invention allows mapping only subsections or regions of interest within the masked expression image.

The application of elastic mapping at 303 yields a new set of coordinates, referred to as registered-mask coordinates, that defines the mapping from the wrinkle patch coordinates to the neutral image. This mapping, however, is not guaranteed to be a one-to-one mapping, i.e., there may be discontinuities (missing pixels) in the registered patch coordinates. In order to eliminate such discontinuities, an interpolation or smoothing procedure can be carried out at 305 to construct a continuous mapping; i.e., a continuous patch or patches. For this purpose, a preferred embodiment of the present invention uses morphological smoothing with a small circular structural element after generation of a new patch or patches from the registered mask coordinates. Other interpolation techniques known in the art may also be used.

After obtaining at 305 a new patch or patches which are smooth and continuous, a new set of coordinates 307 is defined within this patch which replaces the registered mask coordinates generated at 303. The coordinates 307 are referred to as the continuous wrinkle mask coordinates for the neutral image. The coordinates 307 will be used to populate the neutral image with pixels imported from the expression image. However, the corresponding coordinates for these neutral image coordinates need to be found for the expression image. This is done through an inverse mapping process at 309 which defines the mapping from neutral image coordinates to expression image coordinates. Hence, the inverse mapping process at 309 applies the inverse mapping utilizing the inverse elastic registration parameters obtained at 301.

After inverse mapping at 309, the corresponding wrinkle patch coordinates in the expression image 311 are determined. At this point, the spatial mapping is established from each pixel in the neutral image to the corresponding pixel in the expression image. At 313, the wrinkle patch pixels from the expression image are copied to the neutral image according to corresponding coordinates to generate a preliminary wrinkle simulated image 315. The copying procedure of 313 is preferably carried out within the neutral image mask. The neutral image mask confines the mapping to the skin regions of the face, hence preventing the occurrence of structural artifacts in the preliminary wrinkle simulated image 315 in case of a poor elastic registration due to poor correspondence matching.

Provided that a good correspondence matching is obtained, the preliminary wrinkle simulated image 315 should be well registered with the neutral image and can be compared thereto to display the aging effect.

The preliminary wrinkle simulated image 315, however, may have boundary artifacts, i.e., shading and color mismatching along the boundary of the one or more transferred wrinkle patches. As mentioned above, such artifacts can be eliminated using an image mosaicing technique (at 111, FIG. 1) such as the one described by Burt and Adelsan, "A multiresolution spline with application to image mosaics", ACM transactions on Graphics, Vol. 2, No. 4, October 1983. Other mosaicing techniques that are known in the art can also be used.

Variable Wrinkle Aging Simulation

Wrinkle aging simulation in accordance with an exemplary embodiment of the present invention can be demonstrated by displaying on a computer monitor, for example, a rendered image depicting a degree of wrinkle aging between that of a neutral image and a wrinkle simulated image. An interactive control mechanism (e.g., slider control, knob, lever, etc.) can be provided to allow a viewer to vary the degree of aging simulated. Such processes are illustrated in FIGS. 4A and 4B.

Figure 4A:
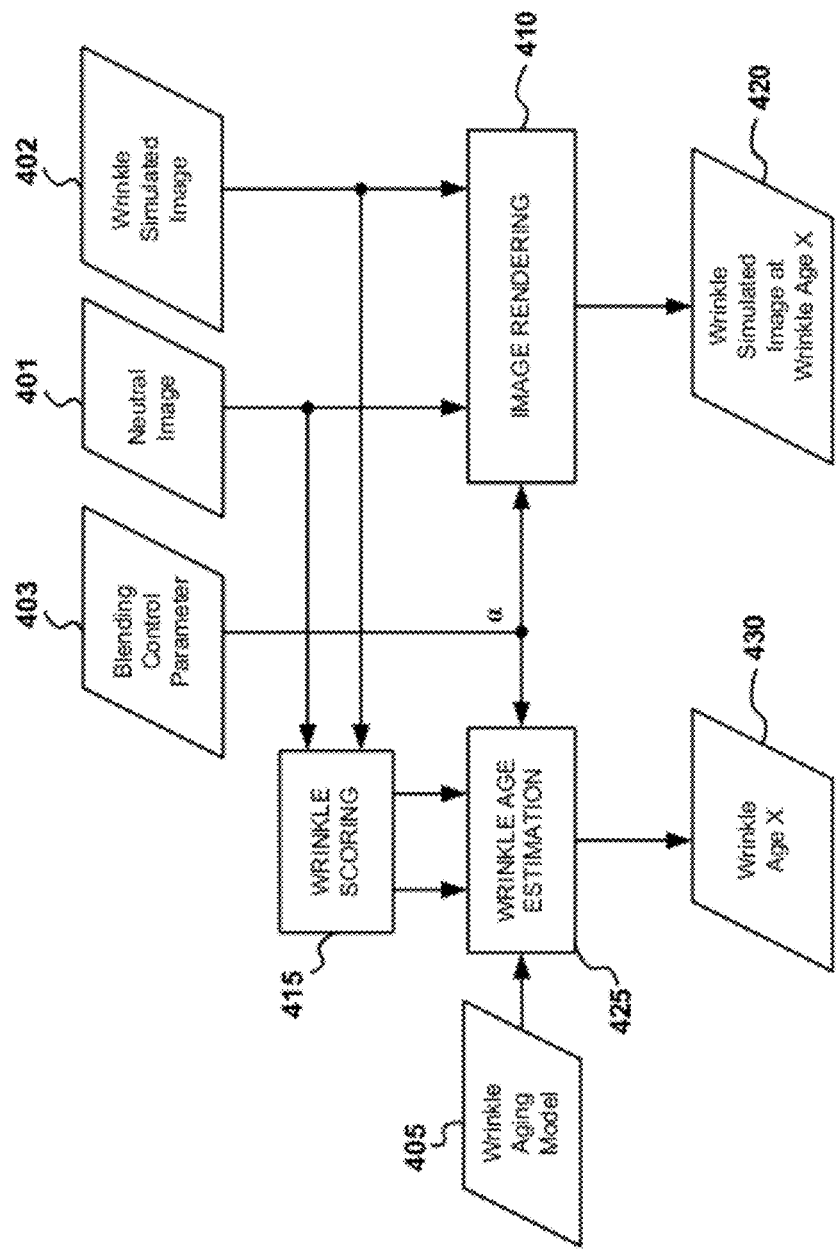
FIGS. 4A and 4B are flowcharts of exemplary methods of blending a wrinkle aged image with a neutral image, wherein the blending is based on a statistical wrinkle aging model, in accordance with the present invention.
Figure 4B:
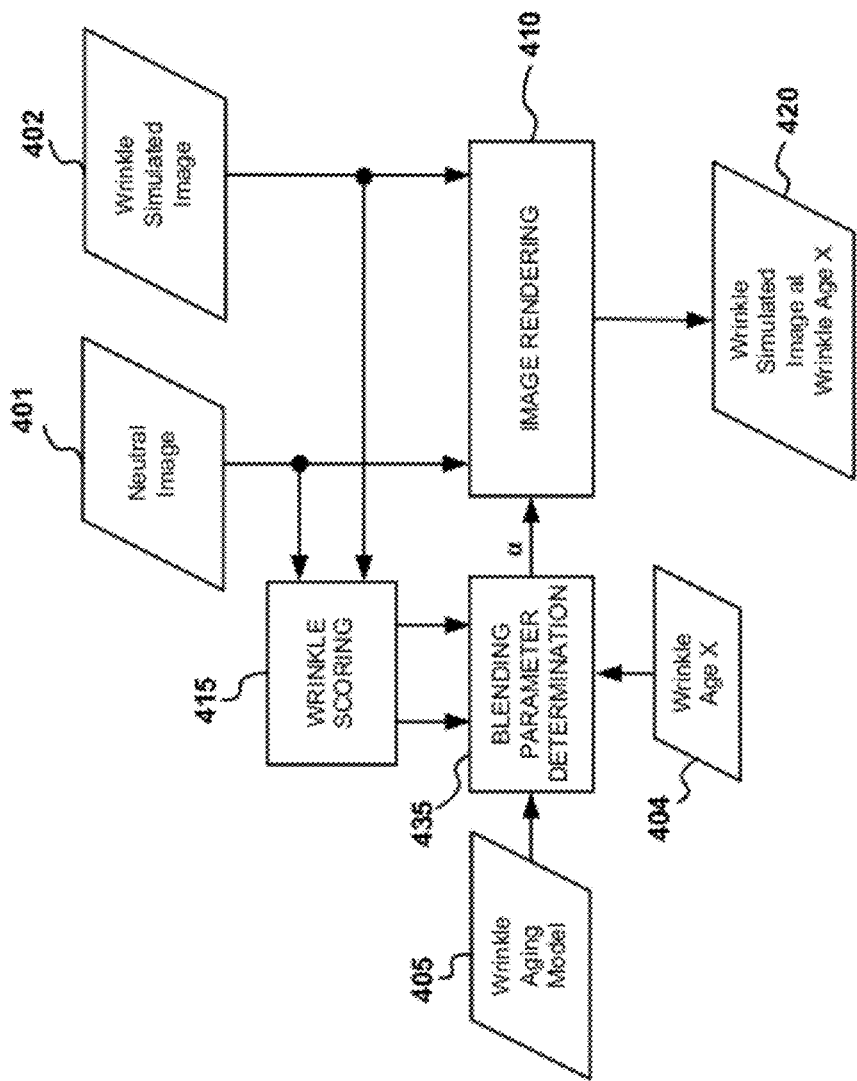

As shown in FIG. 4A, a wrinkle simulated image 402 of a face is blended with a neutral image 401 of the face by an image rendering process 410 to generate a rendered image 420. The image rendering 410 blends the images using, for example, alpha-blending, or any other of a variety of suitable techniques.

The neutral image 401 can be obtained as described above (e.g., 101A, FIG. 1) and the wrinkle simulated image 402 can be generated using the method of FIG. 1. The image rendering 410 can vary the degree of blending between the neutral and wrinkle simulated images in accordance with a blending control parameter 403. The blending control parameter 403 can be provided, for example, from a user input, such as a control knob, slider, keyboard input, or other suitable mechanism, including both hardware and software based implementations, such as a graphical user interface widget, for example or any suitable means by which a user can provide input. At one extreme of the blending control parameter (e.g., with the slider at a first end of its range of motion, i.e., $\alpha=0$), the rendered image 420 is the same as the neutral image 401, and at the other extreme (e.g., $\alpha=1$), it is the same as the wrinkle simulated image 402. As the user varies the blending control parameter by operation of the user input means, the rendered image will vary between the two extremes, thereby displaying variable degrees of wrinkle aging.

As shown in FIG. 4A, a wrinkle age estimation process 425 can be linked to the blending control parameter to generate an estimated wrinkle age 430 corresponding to the blended image 420. Alternatively, the wrinkle age estimation process can be performed offline by changing the degree of blending (i.e., varying $\alpha$ in the range [0 1]) to generate wrinkle simulated images at certain age intervals (e.g., one year). Accordingly, the blending control mechanism (e.g., the slider control) can be labeled for a particular subject prior to the interactive simulation. As described in greater detail below, the wrinkle age estimation process 425 uses a wrinkle aging model 405 which describes the relationship between wrinkle severity (i.e., the amount of wrinkling) and age. Such a model can be derived based on statistical data collected from a large number of people of different ages. The determination of skin severity measures and statistical data for various skin types (or ethnicity groups) is described in U.S. Pat. No. 6,571,003 by Hillebrand et al., "Skin imaging and analysis systems and methods."

Preferably, the wrinkle aging model 405 may be further differentiated according to sex and skin type (or ethnicity), geographic location, and lifestyle so that data from an individual's peer group (classified by e.g., sex, skin type, and/or lifestyle such as smoking) is used to model wrinkle aging for that individual.

A wrinkle scoring process 415 determines wrinkle severity scores for the neutral image 401 and the wrinkle simulated image 402 that are to be blended. An exemplary wrinkle scoring method is described in U.S. patent application Ser. No. 11/681,509. As described in greater detail below with reference to FIG. 5, the wrinkle age estimation process 425 uses the wrinkle aging model 405 and the wrinkle scores of the neutral and wrinkle simulated images to determine the wrinkle age (X) corresponding to the blended image 420 generated by the image rendering process 410.

Whereas the exemplary embodiment of FIG. 4A generates a wrinkle age based on the rendered image, a further exemplary embodiment, illustrated in FIG. 4B, generates the rendered image corresponding to a wrinkle age 404 specified by the user. As described in greater detail below with reference to FIG. 5, a blending parameter determination process 435 uses the wrinkle aging model 405 and the wrinkle scores of the neutral and wrinkle simulated images to determine the blending control parameter ($\alpha$) used by the image rendering 410 to generate a wrinkle simulated image 420 for the specified wrinkle age 404.

Figure 5:
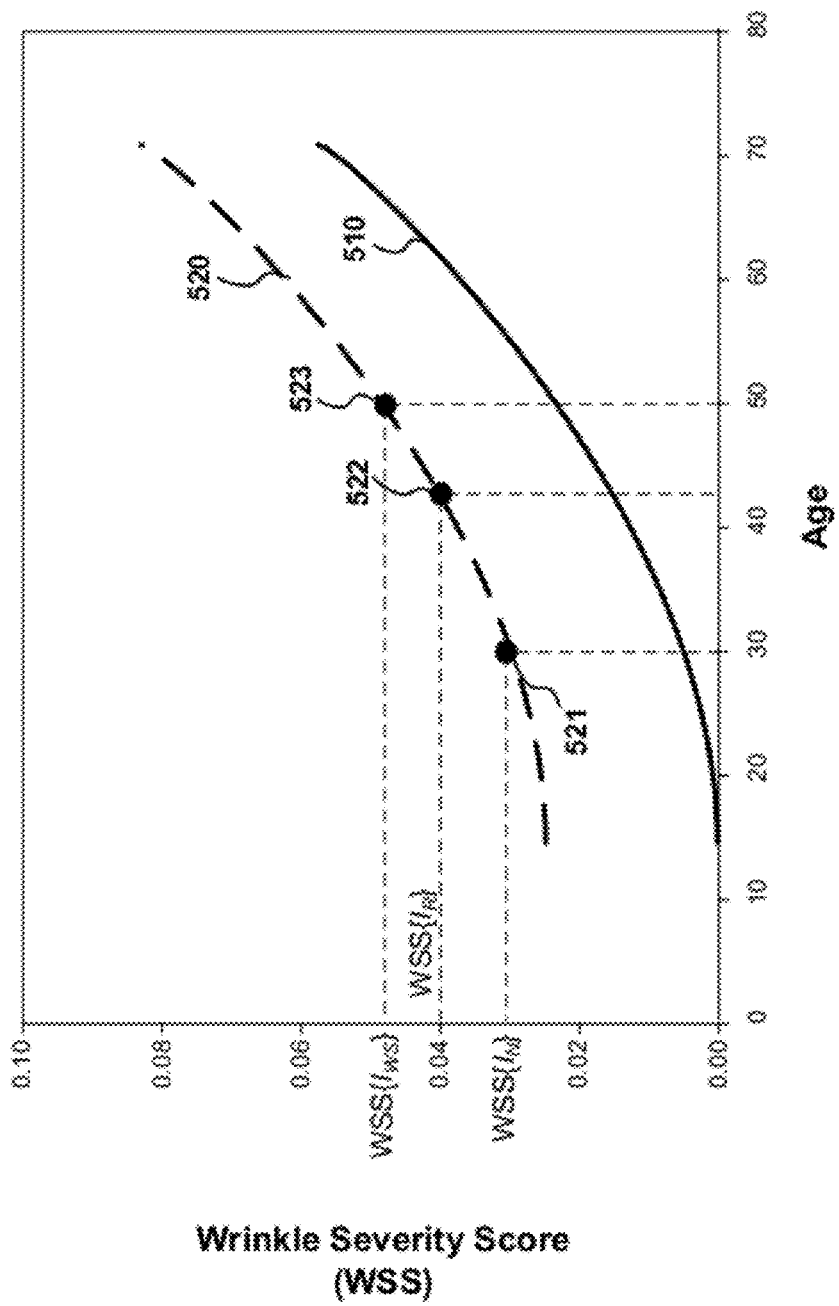
FIG. 5 is a graph illustrating a sample wrinkle aging model that can be utilized in the methods of FIGS. 4A and 4B to simulate wrinkle aging after a certain period of time, in accordance with the present invention.

FIG. 5 shows a wrinkle aging curve 510 representing an exemplary wrinkle aging model for a peer group (e.g., Caucasian females) of the subject of a wrinkle aging simulation. The curve 510 shows the relationship between wrinkle severity score (WSS) and age based on statistical data collected for this peer group. The subject, however, may have a WSS that does not fall on the curve 510. For example, a particular 30 year-old, Caucasion female may have a WSS of 0.03, as opposed to a WSS of 0.005 predicted by the curve 510. For that subject, an individualized wrinkle aging model can be derived by adjusting, such as by shifting, the curve 510 based on the subject's WSS in the neutral state. The curve 520 represents such a curve adjusted for the subject in question.

Referring to FIG. 5, point 521 on curve 520 represents the current WSS of the illustrative 30 year old female Caucasian subject. This WSS is based on the current neutral image ($I_N$) of the subject, and is shown on the y-axis of the chart of FIG. 5 as WSS$\{I_N\}$. A further WSS is determined from a wrinkle simulated image ($I_{WS}$) of the subject, such as may be generated as described above. This value is shown on the y-axis of the chart of FIG. 5 as WSS$\{I_{WS}\}$ and corresponds to the point 523 on the curve 520. From the curve 520, the age corresponding to WSS$\{I_{WS}\}$ can be determined. In the example illustrated in FIG. 5, this age is 50.

An image to be rendered ($I_R$) which simulates wrinkle aging for the subject at an age between the current age (e.g., 30) and the age corresponding to the wrinkle simulated image (e.g., 50), corresponds to a point 522 which lies on curve 520 between points 521 and 523. The WSS of this image is shown on the y-axis of the chart of FIG. 5 as WSS$\{I_R\}$. In the example illustrated in FIG. 5, this value is approximately 0.04, with a corresponding age of 43.

The change in WSS between points 521 and 522 is related to the amount of wrinkling to be added to the neutral image to simulate the subject's wrinkle aging at the age corresponding to point 522. As described below, the change in WSS can be linked to the blending control parameter in the rendering processes depicted in FIGS. 4A and 4B while displaying the rendered image with varying degrees of blending between the neutral image 401 and the wrinkle simulated image 402.

In the exemplary embodiments of FIGS. 4A and 4B, alpha-blending can be used in the image rendering process 410 to blend the neutral image and the wrinkle simulated image in accordance with the following expression:

$$I_R = \alpha I_{WS} + (1-\alpha) I_N, \quad (1)$$

where $\alpha$ is the blending control parameter, which varies between 0 and 1, inclusive, $I_{WS}$ represents the wrinkle simulated image, $I_N$ represents the neutral image, and $I_R$ represents the rendered image for a given value of the blending control parameter $\alpha$.

When the blending control parameter is at its minimum value (i.e., $\alpha=0$), the neutral image is generated as the rendered image. When the blending control parameter is at its maximum value (i.e., $\alpha=1$), the wrinkle simulated image is generated as the rendered image. When the blending control parameter is anywhere between these values, the wrinkle severity score of the subject can be computed by applying a wrinkle severity scoring operator WSS$\{I\}$ to the alpha blending equation (Eq. 1) above to yield the following expression:

$$WSS\{I_R\} = \alpha WSS\{I_{WS}\} + (1-\alpha) WSS\{I_N\}, \quad (2)$$

where WSS$\{I\}$ is the WSS for the image 1. Eq. 2 shows that the WSS of the rendered image is a linear combination of the WSS of the wrinkle simulated image and the neutral image.

In the exemplary embodiment of FIG. 4A, in which the user provides the blending control parameter $\alpha$, such as with a control mechanism (e.g., slider, knob, widget), the wrinkle age estimation process 425 uses Eq. 2 to determine the WSS$\{I_R\}$, the WSS of the image to be rendered. Using the adjusted wrinkle aging model curve 520, the wrinkle age estimation process 425 determines the wrinkle age 430 corresponding to WSS$\{I_R\}$. The rendered image 420 and the corresponding wrinkle age 430 are preferably displayed together to show the user the correlation between wrinkling and age.

In the exemplary embodiment of FIG. 4B, in which the user specifies a wrinkle age to be simulated, the blending parameter determination process 435 uses the adjusted wrinkle aging curve 520 to determine the WSS corresponding to the specified wrinkle age, or rather WSS$\{I_R\}$, the WSS for the image to be rendered. The blending parameter $\alpha$ can be determined by the blending parameter determination process 435 in accordance with the following expression:

$$\alpha = \frac{WSS\{I_R\} - WSS\{I_N\}}{WSS\{I_{WS}\} - WSS\{I_N\}}. \quad (3)$$

Using the blending control parameter $\alpha$, the image rendering process 410 renders the corresponding blended image in accordance with Eq. 1.

Note that in the exemplary embodiment of FIG. 4B, in which the user specifies a wrinkle age to be simulated, the age that the user specifies is preferably first checked to determine that it falls in a range that includes the current age and the age corresponding to the wrinkle simulated image of the subject (i.e., 30 to 50, in this example). If not, it can be limited automatically, or the user can be asked to enter an age that falls in that range before proceeding.

In an exemplary embodiment, the wrinkle aging model curves 510 and 520 can be implemented in look-up tables, for example.

The above described image rendering and wrinkle age prediction aspect of the present invention is not limited to wrinkle aging and can be employed with other skin conditions or defects, including, for example, spots and texture.

Variable Wrinkle De-Aging Simulation

Figure 6A:
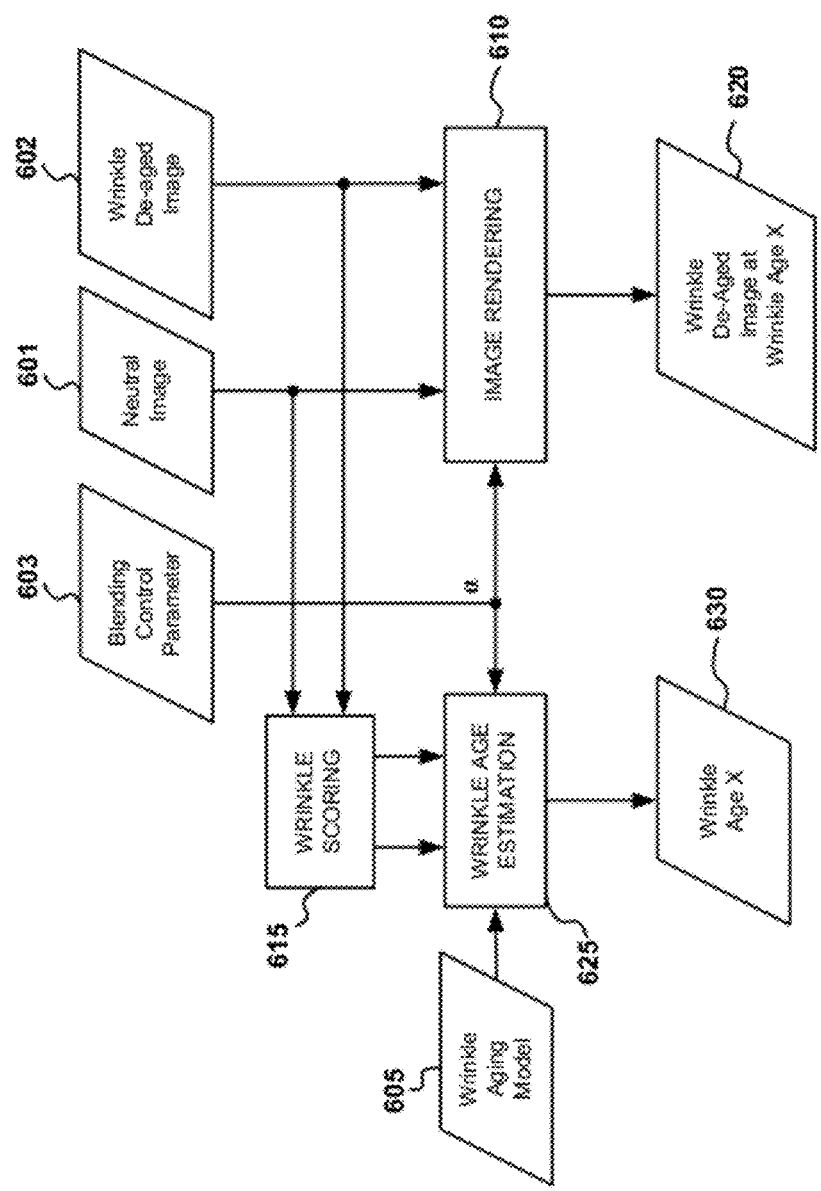
FIGS. 6A and 6B are flowcharts of exemplary methods of blending a wrinkle de-aged image with a neutral image, wherein the blending is based on a statistical wrinkle de-aging model.
Figure 6B:
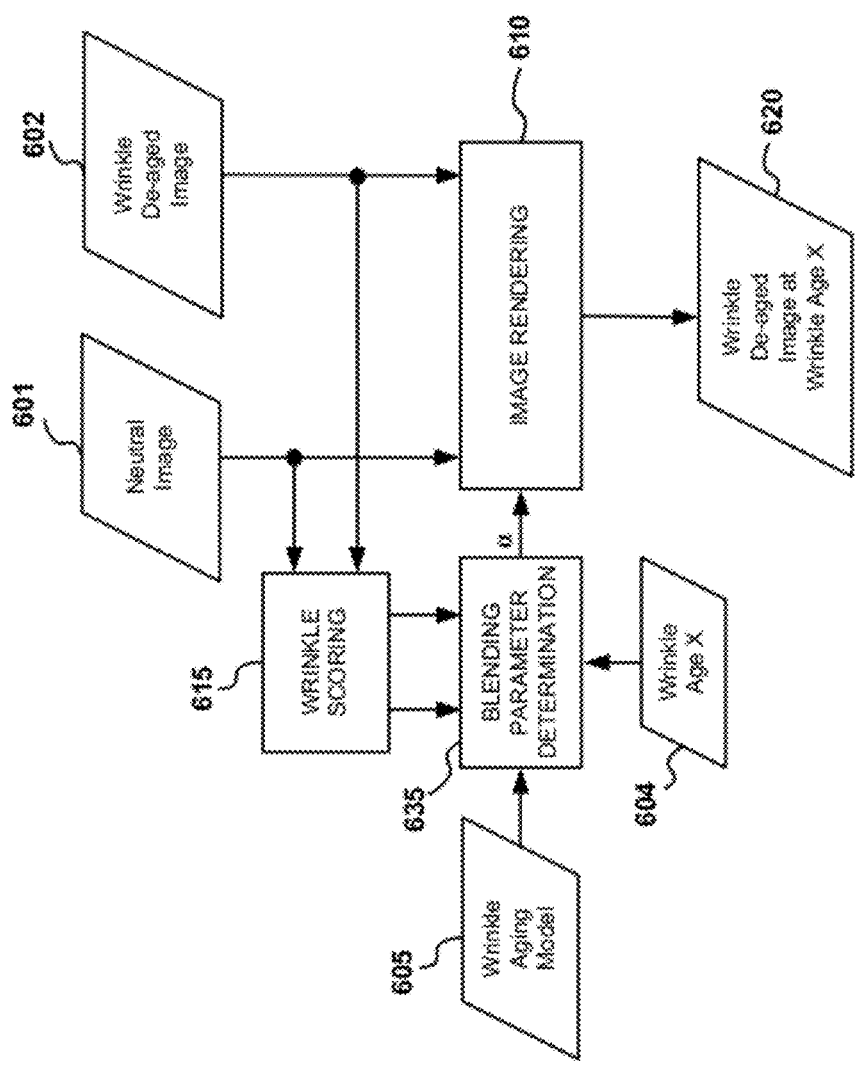

In addition to wrinkle aging simulation, the present invention also provides a variable wrinkle de-aging simulation method using an image rendering process such as described above. Exemplary variable de-aging processes are illustrated in FIGS. 6A and 6B. As shown in FIGS. 6A and 6B, a wrinkle de-aged image 602 is blended with a current neutral image 601 by an image rendering process 610. The wrinkle de-aged image 602 can be generated from the neutral image 601 using a wrinkle de-aging simulation method, such as is described in U.S. patent application Ser. No. 11/681,509.

The image rendering 610 blends the images 601 and 602 using, for example, alpha-blending, or any other of a variety of suitable techniques, with the degree of blending controlled by a blending control parameter. In the embodiment of FIG. 6A, the blending control parameter is provided, for example, from a user input 603, such as a control knob, slider, or other suitable mechanism, including both hardware and software based implementations, such as a graphical user interface widget, for example. Alternatively, as in the embodiment of FIG. 6B, the blending control parameter is generated by a blending parameter determination process 635, described in greater detail below.

At one extreme of the blending control parameter (e.g., with the slider at a first end of its range of motion, i.e., $\alpha=0$), the rendered image 620 is the same as the neutral image 601, and at the other extreme (i.e., $\alpha=1$), it is the same as the wrinkle de-aged image 602. As the blending control parameter varies between its extremes, the rendered image will vary between the neutral image and the wrinkle de-aged simulated image, thereby displaying variable degrees of wrinkle de-aging.

As shown in FIG. 6A, a wrinkle age estimation process 625 can be linked to the blending control parameter to generate an estimated wrinkle age 630 corresponding to the blended image 620. As described in greater detail below, the wrinkle age estimation process 625 uses a wrinkle aging model 605 which describes the relationship between wrinkle severity (i.e., the amount of wrinkling) and age. The model 605 can be the same as the model 405 described above with respect to the variable aging processes of FIGS. 4A and 4B.

A wrinkle scoring process 615 determines wrinkle severity scores for the neutral image 601 and the wrinkle de-aged image 602 that are to be blended. Similarly to the embodiment of FIG. 4A, the wrinkle age estimation process 625 uses the wrinkle aging model 605 and the wrinkle scores of the neutral and wrinkle de-aged simulated images to determine the wrinkle age (X) corresponding to the blended image 620 generated by the image rendering process 610.

Whereas the exemplary embodiment of FIG. 6A generates a wrinkle age based on the rendered image, a further exemplary embodiment, illustrated in FIG. 6B, generates the rendered image corresponding to a wrinkle age 604 specified by the user. As described in greater detail below with reference to FIGS. 7A and 7B, a blending parameter determination process 635 uses the wrinkle aging model 605 and the wrinkle scores of the neutral and wrinkle de-aged simulated images to determine the blending control parameter ($\alpha$) used by the image rendering process 610 to generate a wrinkle de-aged image 620 for the specified wrinkle age 604.

FIG. 7 shows a wrinkle aging curve 710 representing an exemplary wrinkle aging model for the peer group (e.g., Caucasian females) of the subject of a wrinkle de-aging simulation. The curve 710 shows the relationship between wrinkle severity score (WSS) and age based on statistical data collected for this peer group and can be the same as the curve 510 described above. The subject, however, may have a WSS that does not fall on the curve 710. For example, a particular 50 year-old, Caucasian female may have a WSS of 0.048, as opposed to a WSS of 0.015 predicted by the curve 710. For that subject, an individualized wrinkle aging model can be derived by adjusting, such as by shifting, the curve 710 based on the subject's WSS in the neutral state. The curve 720 represents such a curve adjusted for the subject in question.

Figure 7A:
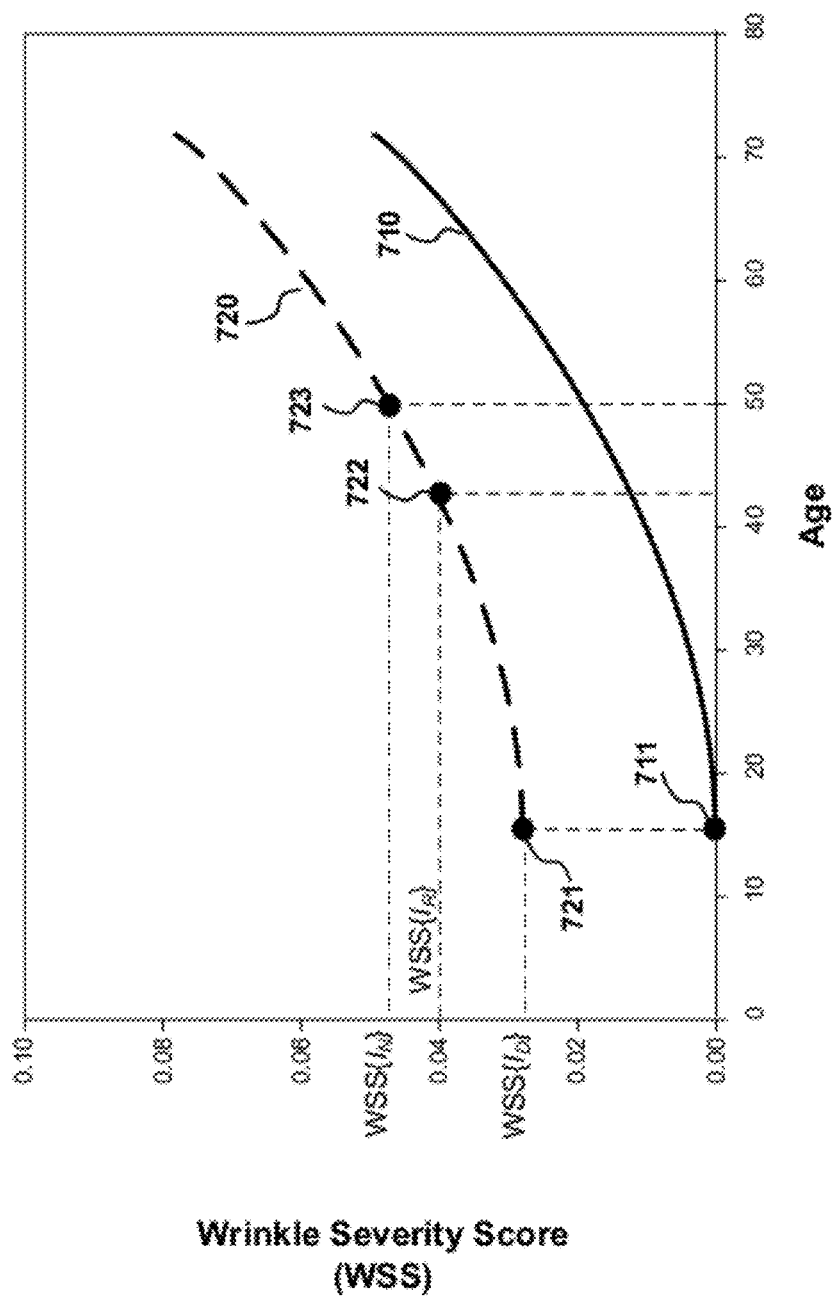
FIGS. 7A and 7B show graphs illustrating sample wrinkle aging models that can be utilized in the methods of FIGS. 6A and 6B to simulate wrinkle de-aging after a certain period of time, in accordance with the present invention.

Referring to FIG. 7, point 723 on curve 720 represents the current WSS of the illustrative 50 year old female Caucasian subject. This WSS is based on the current neutral image ($I_N$) of the subject, and is shown on the y-axis of the chart of FIG. 7A as WSS$\{I_N\}$. A further WSS is determined from a wrinkle de-aged simulated image ($I_D$) of the subject, such as may be generated as described above. This value is shown on the y-axis of the chart of FIG. 7A as WSS$\{I_D\}$ and corresponds to the point 721 on the curve 720. From the curve 720, the age corresponding to WSS$\{I_D\}$ can be determined. In the example illustrated in FIG. 7A, this age is 15.

An image to be rendered ($I_R$) which simulates wrinkle de-aging for the subject at an age between the current age (e.g., 50) and the age corresponding to the wrinkle de-aged simulated image (e.g., 15), corresponds to a point 722 which lies on curve 520 between points 721 and 723. The WSS of this image is shown on the y-axis of the chart of FIG. 5 as WSS$\{I_R\}$. In the example illustrated in FIG. 7A, this value is approximately 0.04, with a corresponding age of 43.

The change in WSS between points 722 and 723 is related to the amount of wrinkling to be removed from the neutral image to simulate the subject's wrinkle aging at the age corresponding to point 722. As described below, the change in WSS can be linked to the blending control parameter in the rendering processes depicted in FIGS. 6A and 6B while displaying the rendered image with varying degrees of blending between the neutral image 601 and the wrinkle de-aged image 602.

In the exemplary embodiments of FIGS. 6A and 6B, alpha-blending can be used in the image rendering process 610 to blend the neutral and wrinkle simulated images in accordance with the following expression:

$$I_R = \alpha I_D + (1-\alpha) I_N, \tag{4}$$

where $\alpha$ is the blending control parameter, which varies between 0 and 1, inclusive, $I_D$ represents the wrinkle de-aged simulated image, $I_N$ represents the neutral image, and $I_R$ represents the rendered image for a given value of the blending control parameter $\alpha$.

When the blending control parameter is at its minimum value (i.e., $\alpha=0$), the neutral image is generated as the rendered image. When the blending control parameter is at its maximum value (i.e., $\alpha=1$), the wrinkle de-aged simulated image is generated as the rendered image. When the blending control parameter is anywhere in between these values, the wrinkle severity score of the subject can be computed by applying a wrinkle severity scoring operator WSS$\{I\}$ to the alpha blending equation (Eq. 4) above to yield the following expression:

$$WSS\{I_R\} = \alpha WSS\{I_D\} + (1-\alpha) WSS\{I_N\}, \tag{5}$$

where WSS$\{I\}$ is the WSS for the image I.

In the exemplary embodiment of FIG. 6A, in which the user determines the blending control parameter $\alpha$, the wrinkle age estimation process 625 uses Eq. 5 to determine the WSS$\{I_R\}$, the WSS of the image to be rendered. Using the adjusted wrinkle aging model curve 720, the wrinkle age estimation process 625 determines the wrinkle age 630 corresponding to WSS$\{I_R\}$. The rendered image 620 and the corresponding wrinkle age 630 are preferably displayed together to show the user the correlation between wrinkling and age.

In the exemplary embodiment of FIG. 6B, in which the user specifies a wrinkle age to be simulated, the blending parameter determination process 635 uses the adjusted wrinkle aging model curve 720 to determine the WSS corresponding to the specified wrinkle age, or rather WSS$\{I_R\}$, the WSS for the image to be rendered. The blending parameter $\alpha$ can be determined by the blending parameter determination process 635 in accordance with the following expression:

$$\alpha = \frac{WSS\{I_N\} - WSS\{I_R\}}{WSS\{I_N\} - WSS\{I_D\}}. \tag{6}$$

Using the blending control parameter α, the image rendering process 610 renders the corresponding blended image in accordance with Eq. 4.

In an exemplary embodiment, the wrinkle aging model curves 710 and 720 can be implemented in look-up tables, for example.

The above described image rendering and wrinkle age prediction aspect of the present invention is not limited to wrinkle aging and can be employed with other skin conditions or defects, including, for example, spots and texture.

Note that in the above-described embodiments, the value WSS{$I_D$} will depend on the wrinkle de-aging simulation process used to generate the wrinkle de-aged image. As noted above, in an exemplary embodiment, the wrinkle de-aged image 602 with which the subject's current image 601 is blended is generated by a process that removes all wrinkles detected in the image 601. In effect, WSS{$I_D$}≈0, which corresponds approximately to the age of 15, as represented by the point 711 on the model curve 710. This is consistent with statistical data which shows generally, that wrinkles start to appear at approximately 15 years of age.

For subjects, however, with severely wrinkled current images, i.e., those whose adjusted wrinkle aging model curve 720 diverges significantly from the peer group curve 710, a wrinkle-free (i.e., WSS≈0) image 602 will tend to unrealistically skew the rendered image 620 toward a less-wrinkled appearance than may be warranted. As such, it may be desirable to limit the time period for which de-aging will be simulated. Moreover, the size of such a de-aging period is preferably based on the current age of the subject, and more specifically, reduced for younger starting ages. Thus, for example, in an exemplary embodiment, the de-aging period may be limited to 2 years for a 20 year old; 5 years for a 30 year old; 8 years for a 40 year old; and so on. Appropriate limits can be determined based on empirical observations. Preferably, the acceptable range of ages is displayed to the user before the user specifies the wrinkle age to be simulated.

Figure 7B:
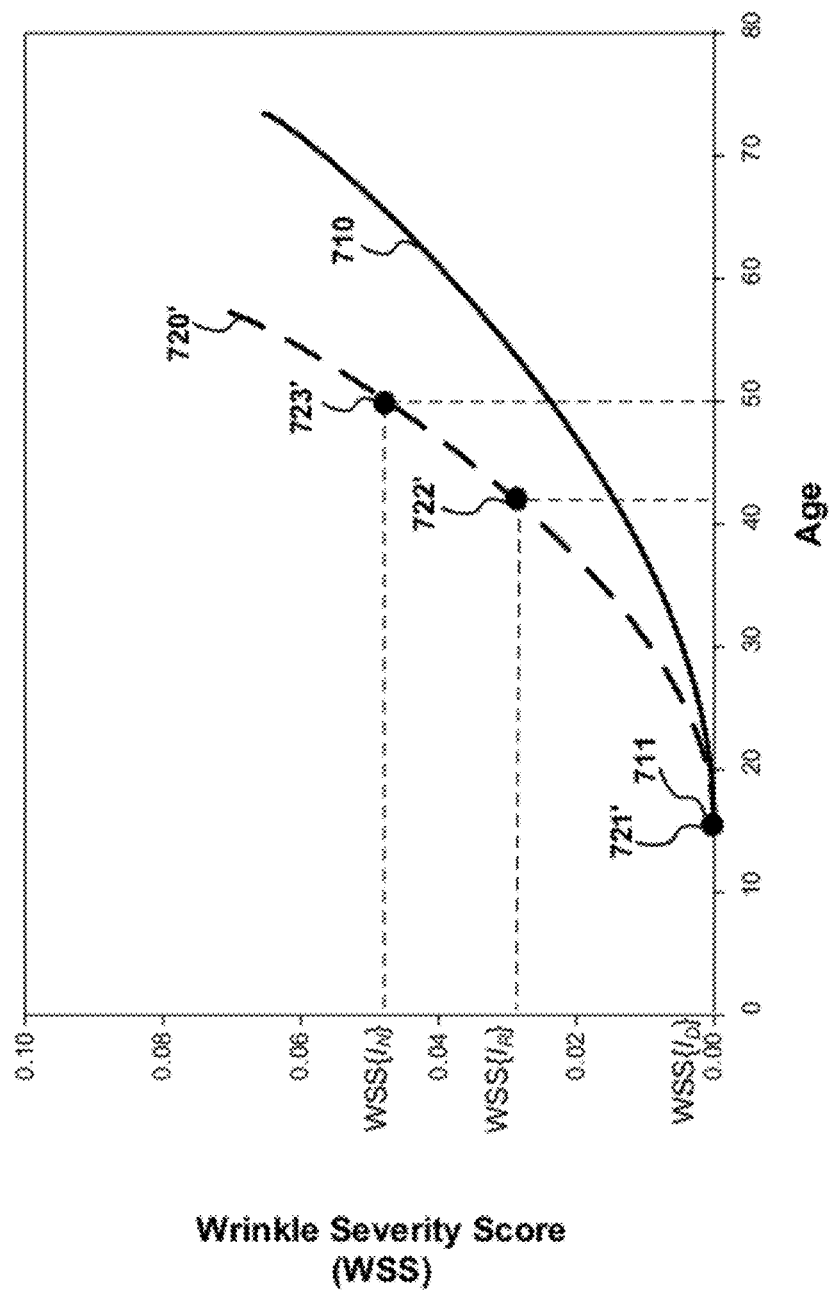

In an alternative embodiment, the above-discussed divergence can be addressed by modifying the adjusted aging model curve as shown in FIG. 7B. In FIG. 7B, a modified adjusted aging model curve 720' is used whose divergence from the aging model curve 710 decreases at younger ages so that the two curves essentially converge at approximately age 15, the age at which facial wrinkles generally start to appear.

Treatment-Based Variable De-Aging Simulation

In another aspect of the present invention, the variable de-aging simulation can incorporate a knowledge-based de-aging model that is based upon treatment. There are a variety of wrinkle treatment options (e.g., topical formulations, injectable fillers, injectable botulinum toxins, fractional resurfacing, light/laser therapy, plastic/cosmetic surgery procedures, etc.) and the effects of these treatments are known by experience. This knowledge based de-aging can be linked to the blending control of the above-described variable de-aging embodiments to yield images of varying degrees of wrinkle de-aging appropriate for the applied treatment. Thus for example, if there is experimental data that a given treatment has been shown to yield a proportional improvement in wrinkle severity score (i.e., $\Delta WSS/WSS_0$, where $WSS_0$ is the pre-treatment WSS), this information can be used to yield a wrinkle de-aged image that simulates the results of such treatment.

Figure 8:
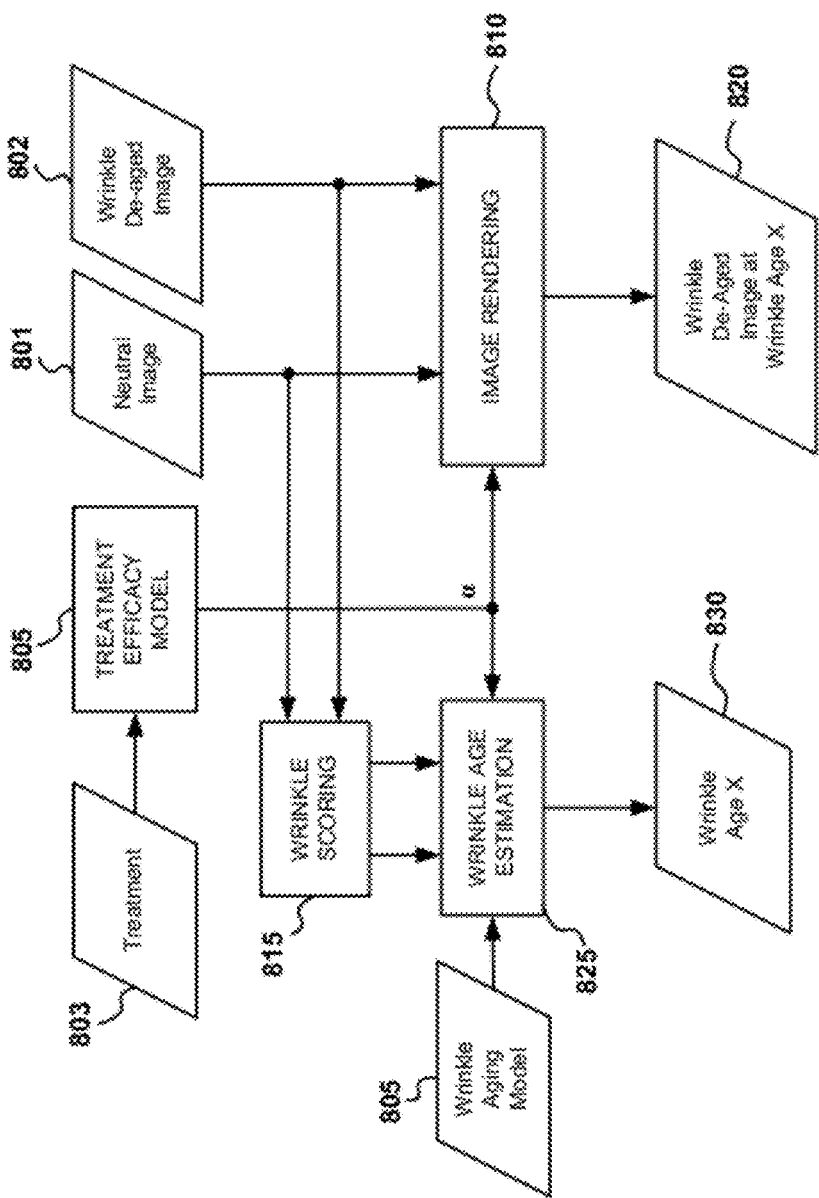
FIG. 8 is a flowchart of an exemplary method of blending a wrinkle de-aged image with a neutral image, wherein the blending is based on a database of treatment alternatives and their expected effectiveness.

FIG. 8 illustrates an exemplary embodiment of a variable de-aging simulation process incorporating a treatment-based de-aging. The process of FIG. 8 will generate a wrinkle de-aged image 820, with a corresponding wrinkle age 830, for a given neutral image 801, a de-aged image 802 (generated, for example, by applying the above-described de-aging process to the neutral image), and a specified treatment 803, which can be provided via user input. The process of FIG. 8 uses a treatment efficacy model 805 to provide a proportional WSS improvement ($\Delta WSS/WSS_0$), for the specified treatment 803. The treatment efficacy model 805 may include, for example, a database of treatment alternatives and the expected outcomes associated therewith. The proportional WSS improvement is used as the blending control parameter α, described above. The image rendering 810, wrinkle scoring 815, and wrinkle age estimation procedures are implemented as described above.

The above-described variable simulation aspect of the present invention is not limited to wrinkle de-aging and can be employed with other skin conditions or defects, including, for example, spots and texture.

Lifestyle-Based Variable Aging/De-AGING Simulation

In another aspect of the present invention, the variable de-aging simulation can incorporate a knowledge-based wrinkle aging/de-aging model that is based upon lifestyle. Wrinkle aging can be influenced considerably in both positive and negative ways by lifestyle. Lifestyle choices or factors that have been shown to have a negative impact on or accelerate wrinkle aging include, for example, smoking, sun exposure, obesity, diabetes, and various other conditions or diseases, each of which can result in accelerated or premature aging. Other lifestyle factors such as diet and physical activity, for example, or measures taken to reverse the negative effects of damaging lifestyle factors, will have a positive impact on or retard wrinkle aging. In accordance with an exemplary embodiment of the present invention, a knowledge-based model incorporating the effects of such factors can be linked to the blending control of the above-described variable aging or de-aging embodiments to yield images of varying degrees of wrinkle aging/de-aging appropriate for lifestyle factors specified by the user. Thus for example, if there is experimental data that a given lifestyle factor has been shown to yield a proportional degradation in wrinkle severity score (i.e., $\Delta WSS/WSS_0$, where $WSS_0$ is the pre-treatment WSS), this information can be used to yield a wrinkle aged image that simulates the effects of such a lifestyle factor.

Figure 9:
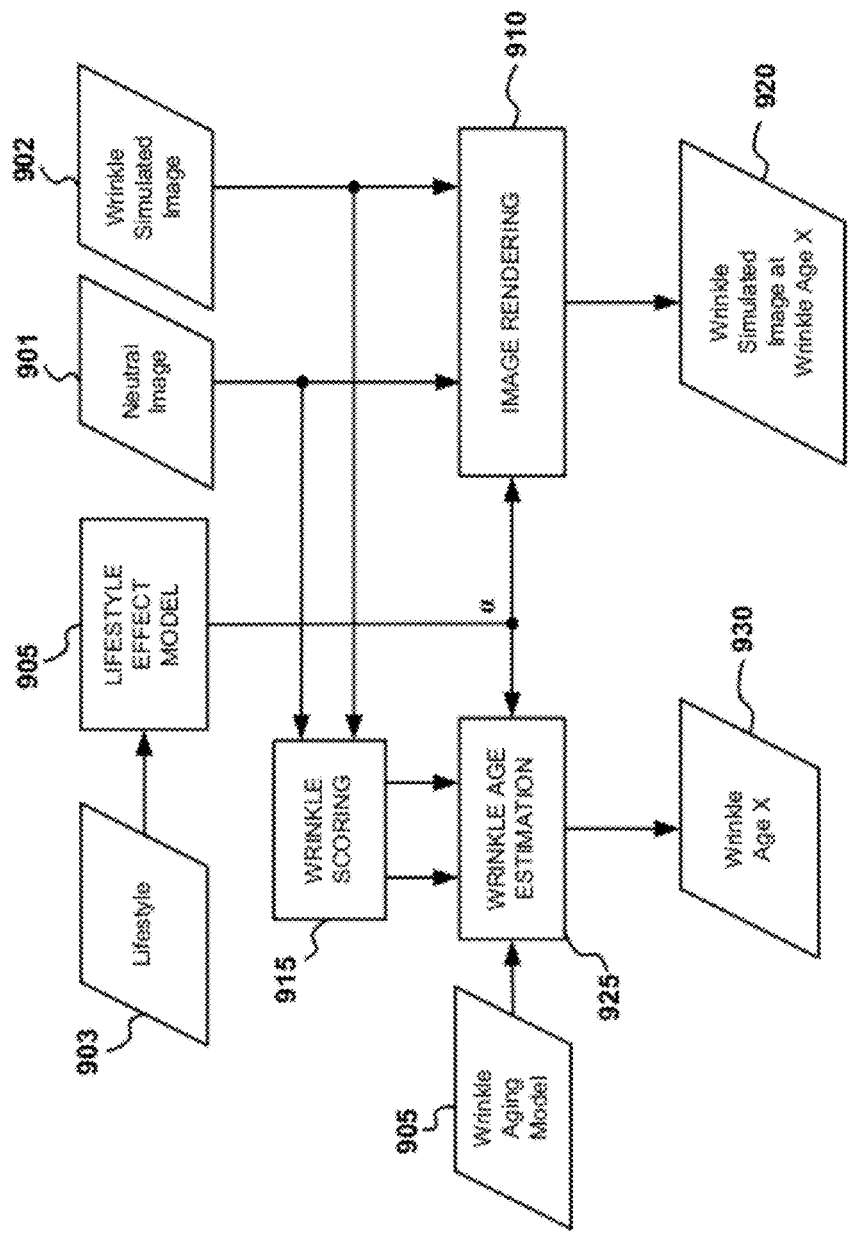
FIG. 9 is a flowchart of an exemplary method of blending a wrinkle image with a neutral image, wherein the blending is based on a database of lifestyle factors and their expected effects on facial wrinkles.

FIG. 9 illustrates an exemplary embodiment of a variable aging/de-aging simulation process incorporating the effects of lifestyle factors. The process of FIG. 9 will generate a wrinkle simulated image 920, with a corresponding wrinkle age 930, for a given neutral image 901, a wrinkle aged or de-aged simulated image 902, and a specified lifestyle factor 903, which can be provided via user input. The process of FIG. 9 uses a lifestyle effect model 905 to provide a proportional WSS change ($\Delta WSS/WSS_0$), for the specified lifestyle factor 903. The lifestyle effect model 905 may include a database of lifestyle factors and their expected effects on facial wrinkles. The proportional WSS change is used as the blending control parameter α, as described above. The image rendering 910, wrinkle scoring 915, and wrinkle age estimation 925 procedures are implemented as described above.

Wrinkle-Aging Simulation Example

Figure 11A:
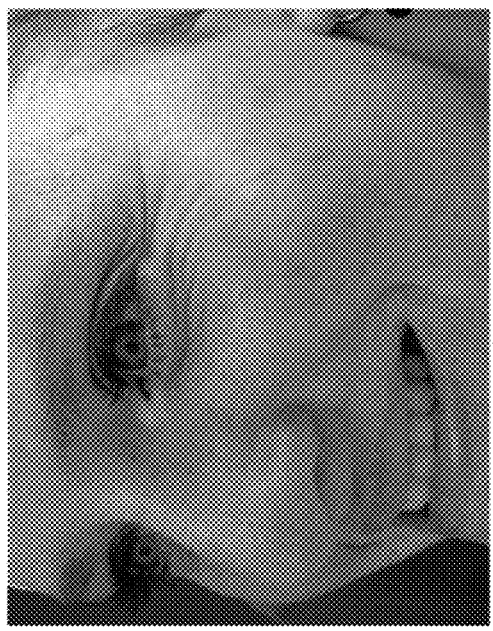
FIGS. 11A through 11D are facial images which illustrate the use of expression wrinkles in predicting the wrinkled appearance of the face in the future.
Figure 11B:
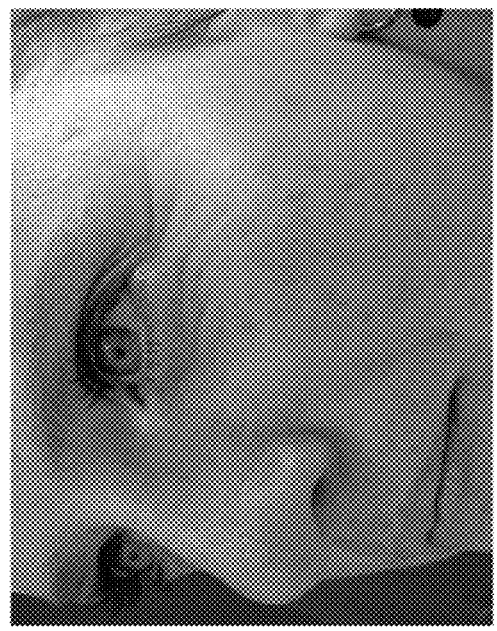
Figure 11C:

FIGS. 11A through 11D are facial images which illustrate the basic principle in using expression wrinkles in predicting the wrinkled appearance of the face in the future. Facial images of a female Caucasian subject at age 28 were captured both in a neutral and in a smile expression state, shown in FIGS. 11A and 11B, respectively. The images were captured using a controlled imaging system employing a Fuji DS330 digital camera equipped with a close-up lens mounted into a standardized illumination rig fitted with head positioning aids, as described in K. Miyamoto et al. "The Beauty Imaging System: For the Objective Evaluation of Skin Condition," Journal of Cosmetic Science, 53 (1), 2002, pp. 62-65. For comparison, FIG. 11C shows a neutral image of the same subject at age 37 captured with the same imaging system. One can visually appreciate the progression of smile wrinkles visible at age 28 (FIG. 11B) in the neutral image captured at age 37 (FIG. 11C).

Figure 11D:
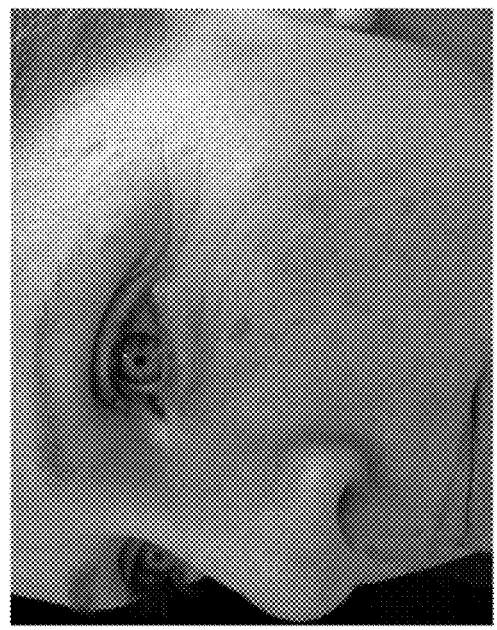

Based on the neutral and smile images at age 28, a wrinkle-aged simulated image was generated by an exemplary embodiment of the wrinkle-aging simulation method of the present invention. This wrinkle-simulated image is shown in FIG. 11D. It can be observed that the wrinkle-aged simulated image (FIG. 11D) based on the images of age 28 agrees well with the age 37 image (FIG. 11C) in terms of the appearance of wrinkles. This demonstrates the effectiveness of the aging simulation method of the present invention in predicting the wrinkled (i.e., aged) appearance of the face.

FIGS. 12A through 12H demonstrate the progression of expression wrinkles in the peri-orbital region of the face of the subject of FIGS. 11A-D from age 28 to age 37. FIGS. 12A, 12C, 12E and 12G are, respectively, an image of the peri-orbital region of the face in the neutral state at age 28; an image of the same region in the smile expression state at age 28; a wrinkles-simulated image based on the aforementioned images; and an image of the same region in the neutral state at age 37. FIGS. 12B, 12D, 12F and 12H are, respectively, the corresponding wrinkles-detected images generated with a wrinkle detection method as described in U.S. patent application Ser. No. 11/681,509. The settings of the wrinkle detection method are the same for all of the images. In FIGS. 12B, 12D, 12F and 12H, the wrinkles that are detected within the region delimited by the polygon 1200 are shown highlighted.

Figure 12A:
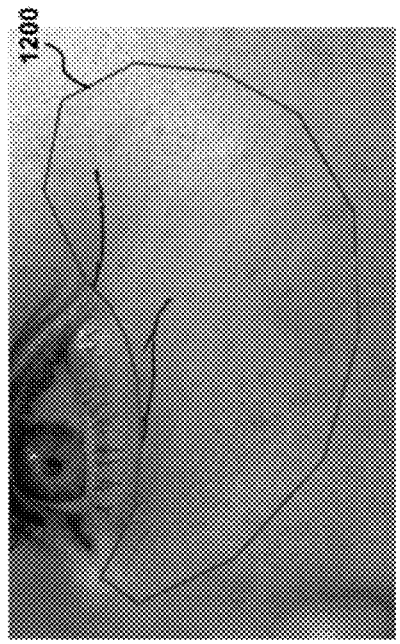
FIGS. 12A through 12H are facial images which demonstrate the progression of expression wrinkles in the periorbital region of the face over a nine year period.
Figure 12B:
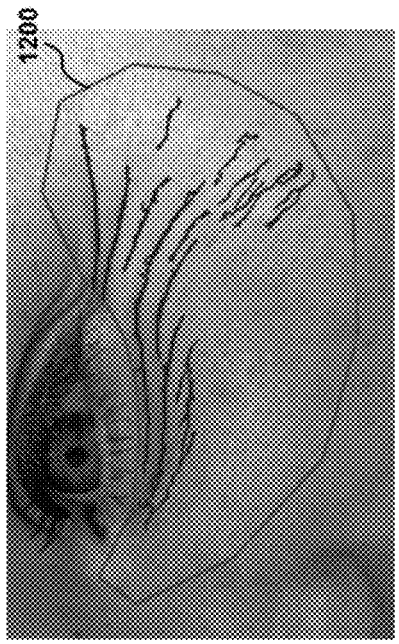
Figure 12C:
Figure 12D:
Figure 12E:
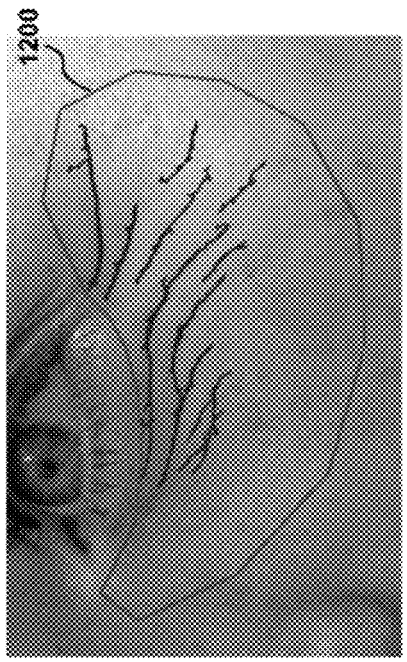
Figure 12F:
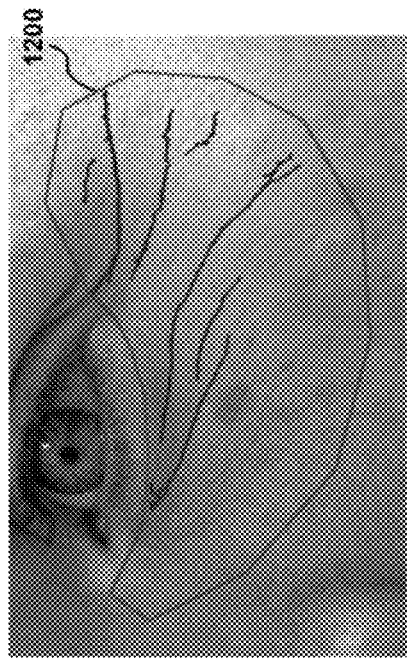

As can be seen from FIG. 12B, very few wrinkles are detected for the neutral image of FIG. 12A. As shown in FIG. 12D, however, many more wrinkles are detected for the smile expression image of FIG. 12C. The amount of new wrinkles appearing in the smile image is visually evident. Using an exemplary method in accordance with the present invention, the smile-induced wrinkles are registered onto the neutral image of FIG. 12A to achieve the wrinkle-aged simulated image of FIG. 12E with natural looking wrinkles. FIG. 12F shows the wrinkles-detected image corresponding to FIG. 12E.

Figure 12G:
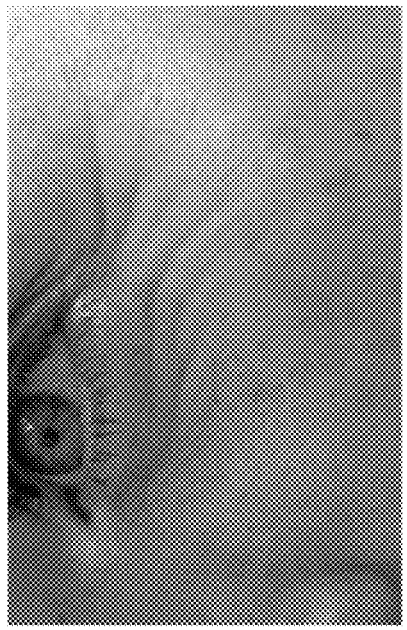
Figure 12H:

To demonstrate the accuracy of the aging-simulation method of the present invention, the actual age 37 image of the subject in the same region-of-interest is shown in FIG. 12G column along with the corresponding wrinkles-detected image in FIG. 12H. Most of the expression-induced wrinkles are visible in the age 37 image. In other words, most of the wrinkles detected for the age 37 image have been predicted with the aging-simulation method of the present invention.

The present invention can be implemented, for example, using a computer programmed in accordance with the methods described herein. An exemplary hardware configuration that can be used for the present invention is described in U.S. patent application Ser. No. 11/681,509. It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of manipulating a facial image so as to simulate variable wrinkle aging comprising:
    capturing a first image of a face and determining a wrinkle severity score for the first image;
    generating a second image and determining a wrinkle severity score for the second image based on the first image, wherein the second image is a wrinkle-changed image;
    generating a third image by blending the first and second images in accordance with a blending parameter and determining a wrinkle severity score for the third image based on the wrinkle severity scores of the first and second images and the blending parameter, wherein the blending parameter is based on a user input; and
    determining a wrinkle age from the wrinkle severity score of the third image in accordance with a wrinkle aging model, wherein the wrinkle aging model provides a relationship between wrinkle age and wrinkle severity score.

2. The method of claim 1, wherein the second image is a wrinkle-aged simulated image.

3. The method of claim 2, wherein the first image is an image of the face in a neutral state and the second image is based on the first image and a further image of the face in an expression state.

4. The method of claim 1, wherein the second image is a wrinkle de-aged simulated image.

5. The method of claim 4, wherein generating the second image includes:
    detecting wrinkles in the first image; and
    eliminating the wrinkles detected.

6. The method of claim 1, wherein the wrinkle aging model includes a peer-group-based wrinkle aging model.

7. The method of claim 1, wherein:
    the user input includes a specified treatment, and
    the blending parameter is determined in accordance with the specified treatment.

8. The method of claim 7, wherein a database of expected outcomes of one or more treatments is used to determine the blending parameter.

9. The method of claim 1, wherein the wrinkle aging model is adjusted in accordance with the wrinkle severity score of the first image.

10. The method of claim 1, wherein the wrinkle severity score of the third image is determined as a linear function of the wrinkle severity scores of the first and second images in accordance with the blending parameter.

11. The method of claim 1, wherein the third image is generated by alpha-blending the first and second images.

12. The method of claim 1, wherein:
    the user input includes a specified lifestyle choice, and
    the blending parameter is determined in accordance with the specified lifestyle choice.

13. The method of claim 12, wherein a database of expected effects of one or more lifestyle choices is used to determine the blending parameter.

14. A method of manipulating a facial image so as to simulate variable wrinkle aging comprising:
    capturing a first image of a face and determining a wrinkle severity score for the
    first image;

generating a second image based on the first image and determining a wrinkle severity score for the second image, wherein the second image is a wrinkle-changed image; and generating a third image by blending the first and second images in accordance with a blending parameter and determining a wrinkle severity score for the third image based on the specified wrinkle age in accordance with a wrinkle aging model, wherein the wrinkle aging model provides a relationship between wrinkle age and wrinkle severity score and the blending parameter is based on a user input which includes a specified wrinkle age.

15. The method of claim 14, wherein the blending parameter is determined as a linear function of the wrinkle severity scores of the first, second, and third images.

\* \* \* \* \*